US007070228B2

(12) United States Patent
Shimizu et al.

(10) Patent No.: US 7,070,228 B2
(45) Date of Patent: Jul. 4, 2006

(54) PRESS MOLDING AND ITS HIGH FREQUENCY QUENCHING METHOD AND ITS HIGH FREQUENCY QUENCHING SYSTEM

(75) Inventors: Satoshi Shimizu, Hamura (JP); Sou Suzuki, Hamura (JP); Takao Minagawa, Hamura (JP); Hisao Hoshino, Hamura (JP); Yahiro Shimizu, Kawasaki (JP); Kouji Haya, Kawasaki (JP); Shingo Shikuwa, Kawasaki (JP); Shigeki Kishihara, Kawasaki (JP)

(73) Assignee: Kikuchi Co., Ltd., Tokyo (JP)

( * ) Notice: Subject to any disclaimer, the term of this patent is extended or adjusted under 35 U.S.C. 154(b) by 0 days.

(21) Appl. No.: 10/473,220

(22) PCT Filed: Nov. 5, 2002

(86) PCT No.: PCT/JP02/11508

§ 371 (c)(1), (2), (4) Date: Sep. 25, 2003

(87) PCT Pub. No.: WO03/046230

PCT Pub. Date: Jun. 5, 2003

(65) Prior Publication Data

US 2004/0113461 A1 Jun. 17, 2004

(30) Foreign Application Priority Data

Nov. 27, 2001 (JP) ............................ 2001-360343
Dec. 13, 2001 (JP) ............................ 2001-380660
Sep. 9, 2002 (JP) ............................ 2002-262487

(51) Int. Cl.
*B62D 25/04* (2006.01)
*E04C 3/30* (2006.01)
*C21D 1/10* (2006.01)
*C21D 9/00* (2006.01)

(52) U.S. Cl. .......................... 296/187.01; 296/193.06; 52/735.1

(58) Field of Classification Search .......... 296/193.06, 296/187.01; 52/735.1
See application file for complete search history.

(56) References Cited

U.S. PATENT DOCUMENTS 3,972,744 A 8/1976 Cantrell (Continued)

FOREIGN PATENT DOCUMENTS

JP 61-76611 4/1986

(Continued)

*Primary Examiner*—Dennis H. Pedder
(74) *Attorney, Agent, or Firm*—Flynn, Thiel, Boutell & Tanis, P.C.

(57) ABSTRACT

A press formed article such as a center pillar or the like for a vehicle having a demanded strength distribution achieved by hardening through induction hardening or the like, and a method and an apparatus for performing induction hardening on the press formed article. The center pillar (10) being a press formed article has an intermediate top portion (11) which extends in a longitudinal direction of the center pillar (10), and two blade portions (12) which are both bent in the same direction from both sides of the intermediate top portion (11), in which hardening regions (Q) are provided on both sides of the intermediate top portion (11), extending over the intermediate top portion (11) and the blade portions (12). These hardening regions (Q) hardened by the induction hardening apparatus are regions in a form which widens toward the end and continuously expand from the upper portion to the lower portion of the center pillar (10). Therefore, the ratio between the hardening regions and non-hardening regions changes in the longitudinal direction of the center pillar (10), resulting in a demanded strength distribution.

12 Claims, 18 Drawing Sheets

20 16 S5 S5 18 11 12 12 10 13 13 S6 S6 18 Q Q 19 19 S7 S7 17

101C 112 112 101C 111 101A 111 112A 102 102 112A 101D 101D 101B 101B 113 113

U.S. PATENT DOCUMENTS 4,194,763 A * 3/1980 Reidelbach et al. ........ 280/784
6,059,899 A * 5/2000 Shibata et al. .............. 148/320
2002/0033618 A1* 3/2002 Kwon ................... 296/203.03

FOREIGN PATENT DOCUMENTS

JP 5-331529 12/1993
JP 10-017933 1/1998
JP 11-140537 5/1999
JP 0 953 495 11/1999
JP 2000-256733 * 9/2000
JP 2000-282136 10/2000
WO WO 02/079525 10/2002

* cited by examiner

F I G. 1
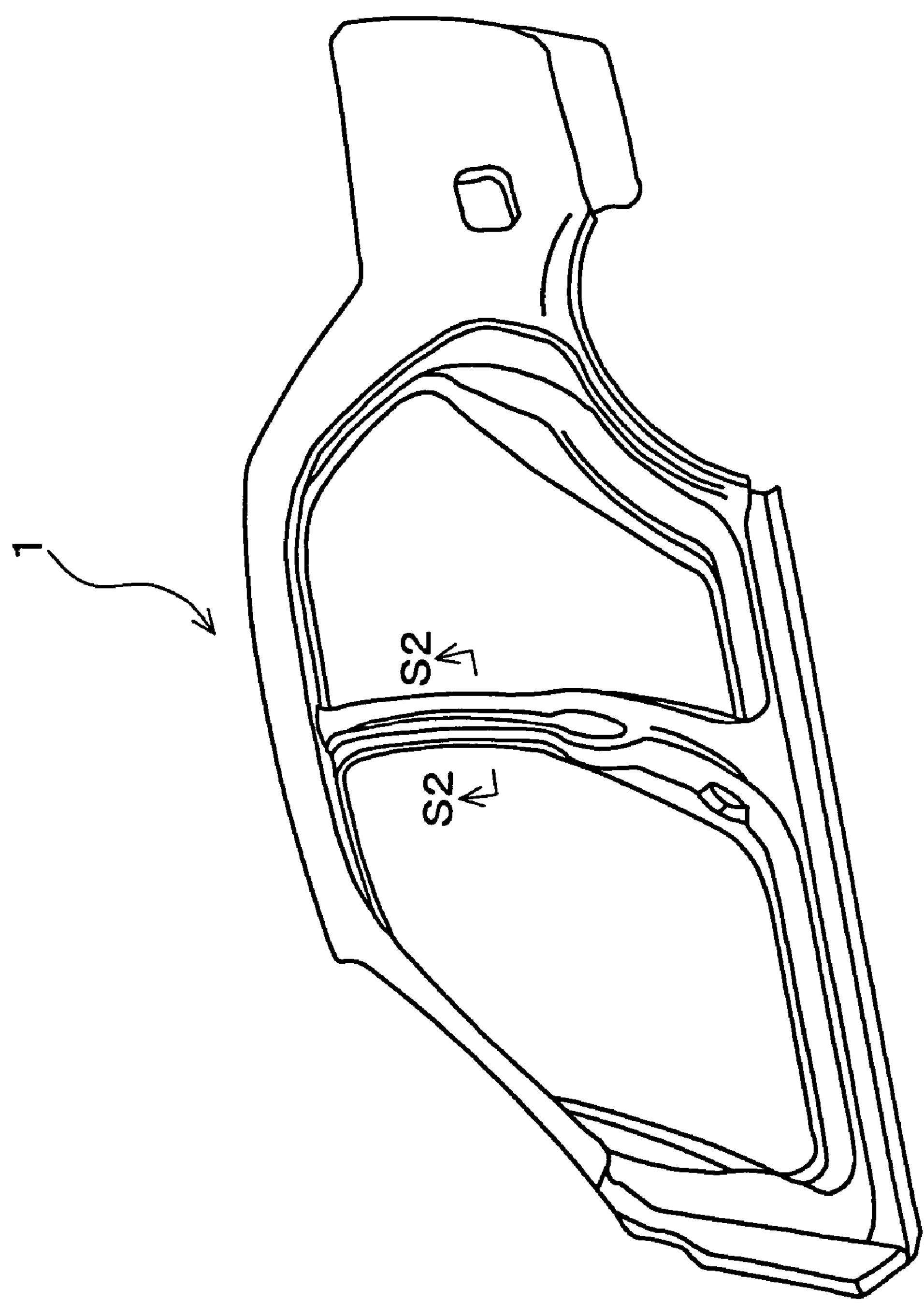

F I G. 2
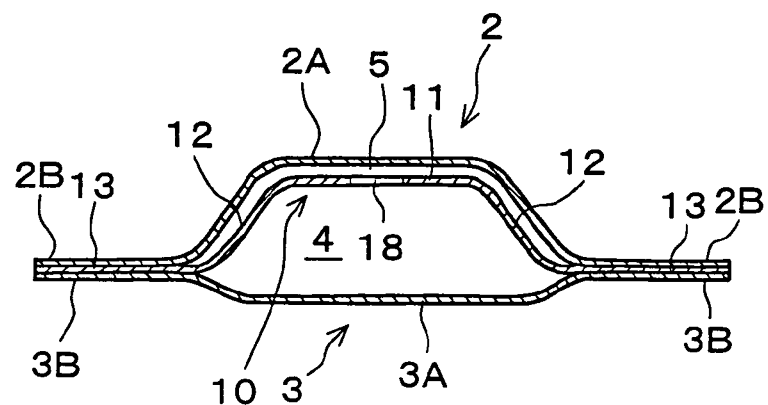
F I G. 3
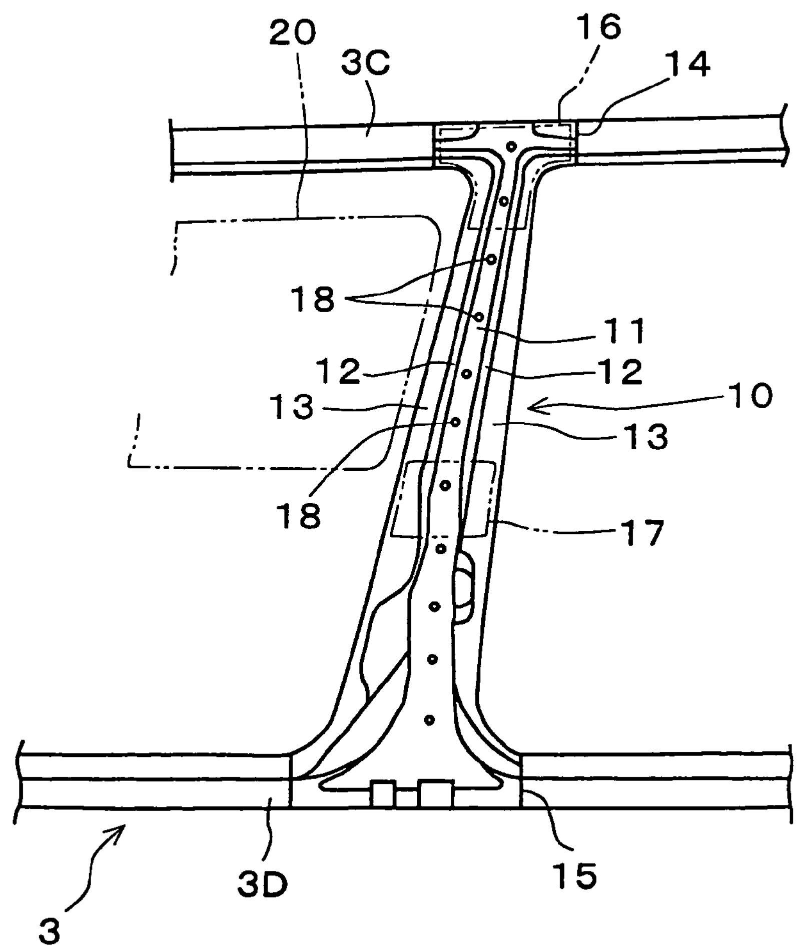

F I G. 4
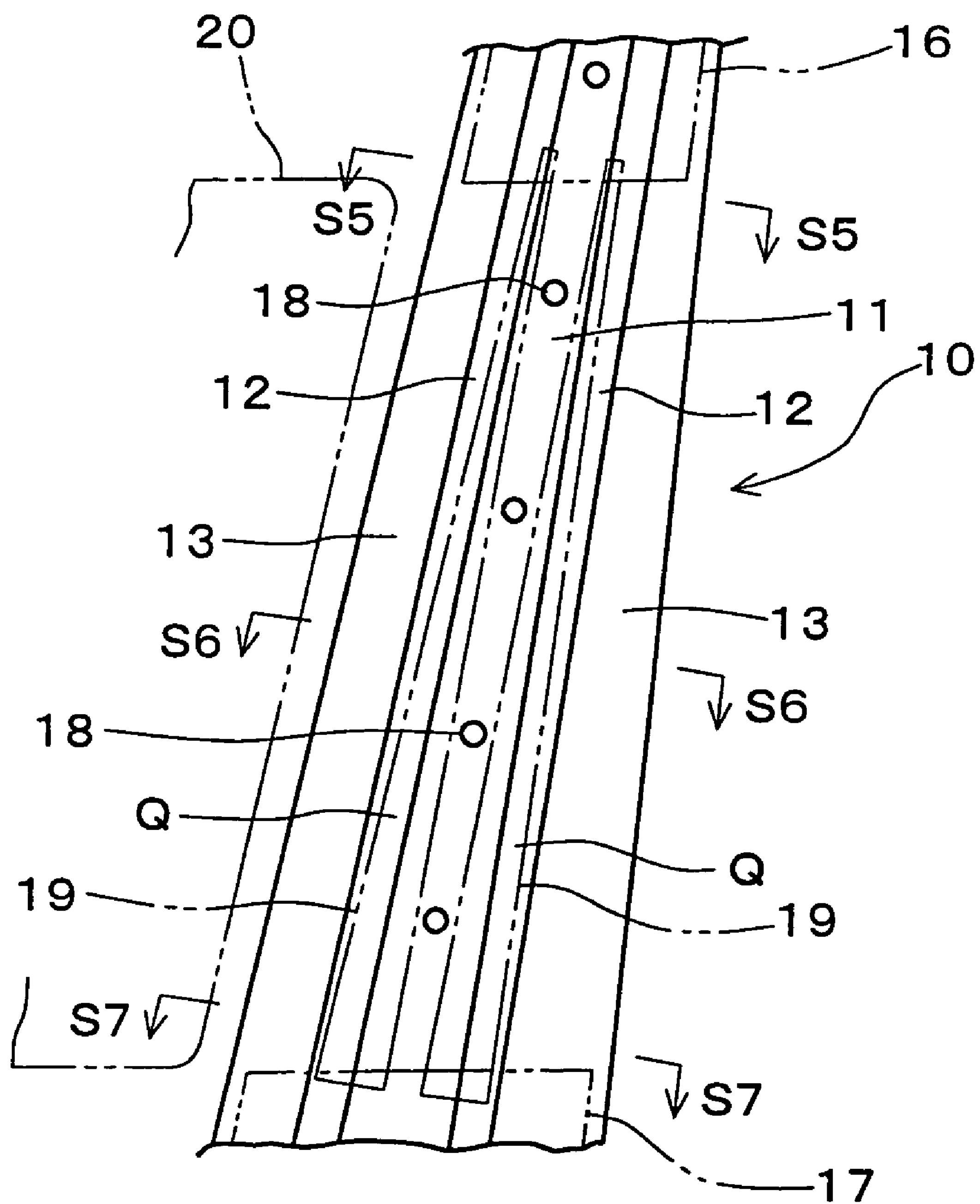

F I G. 8
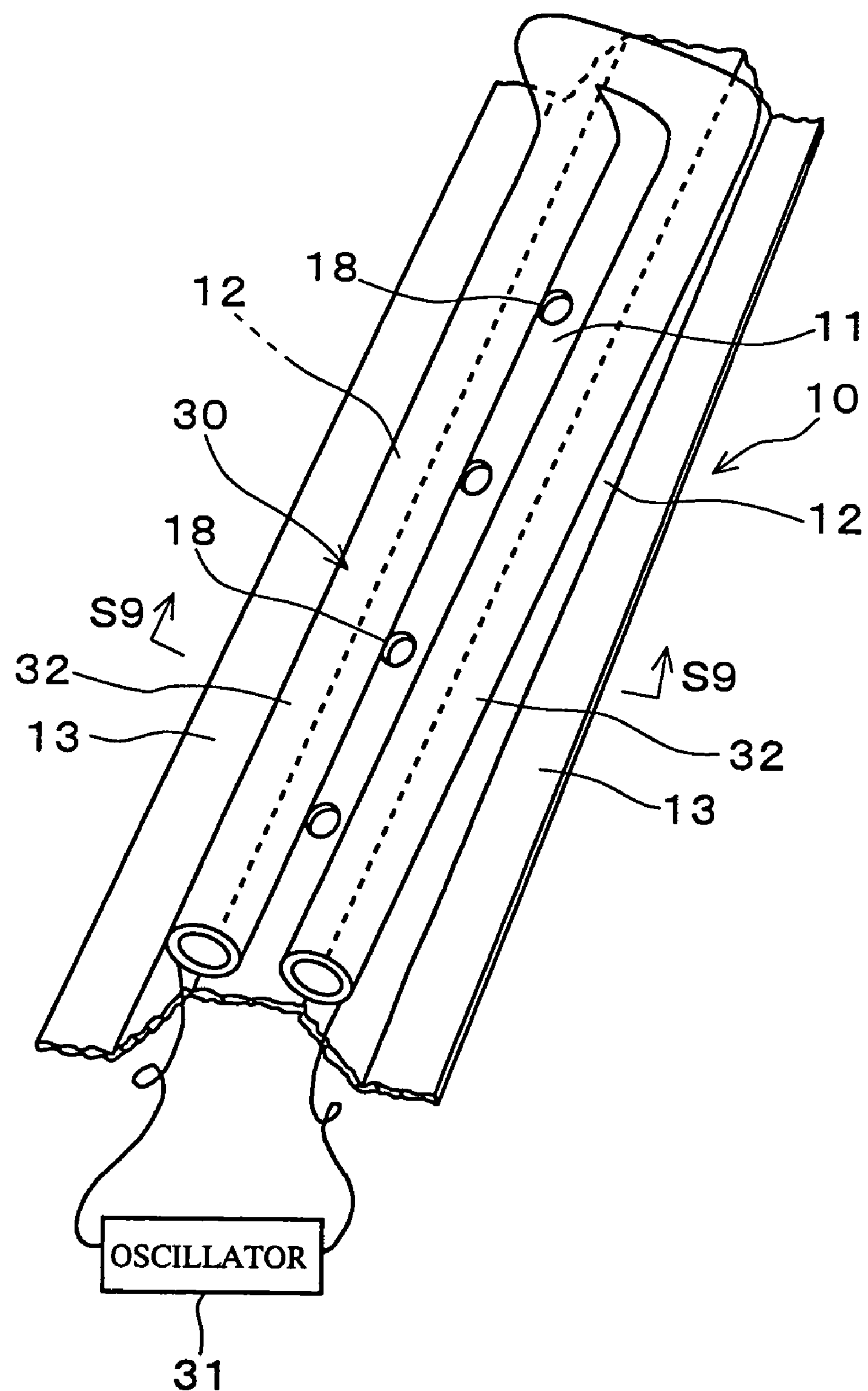

F I G. 9
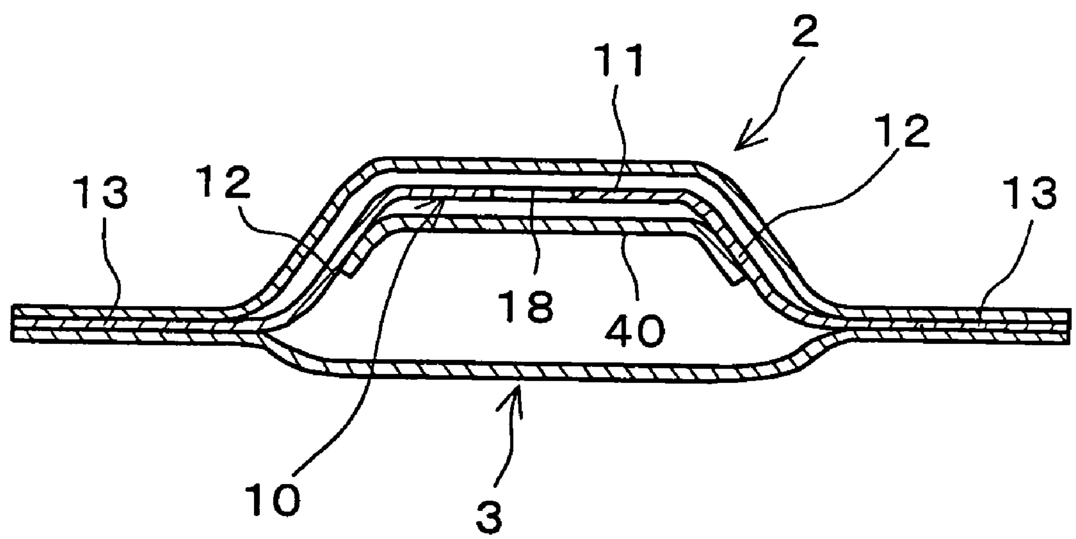

F I G. 1 0
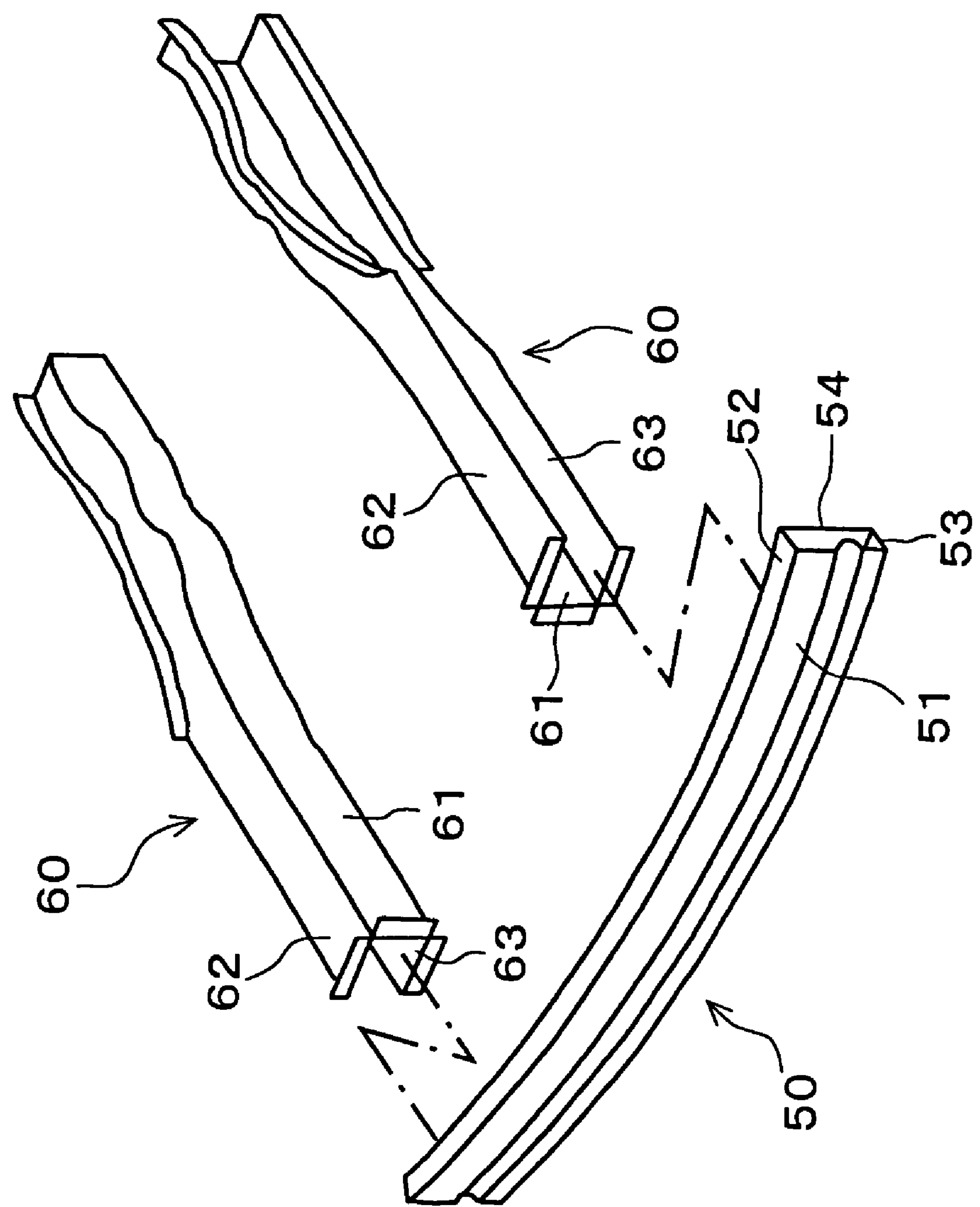

F I G. 1 1
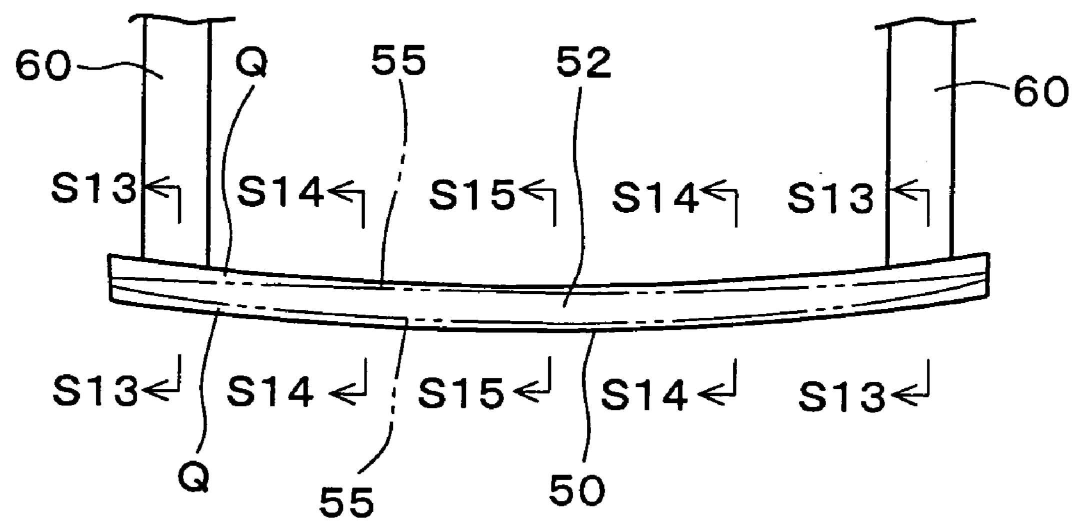
F I G. 1 2
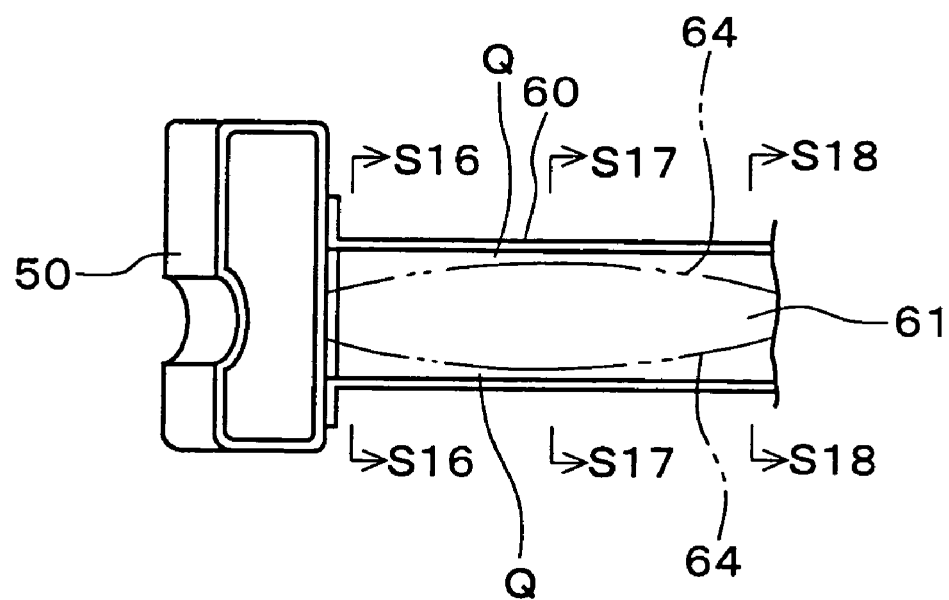

F I G. 1 3
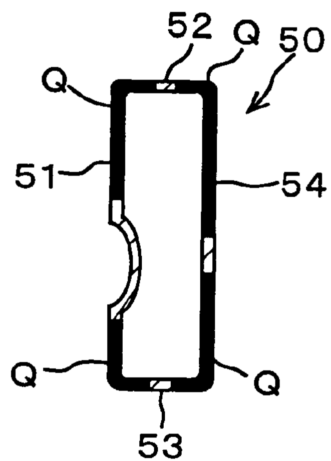
F I G. 1 4
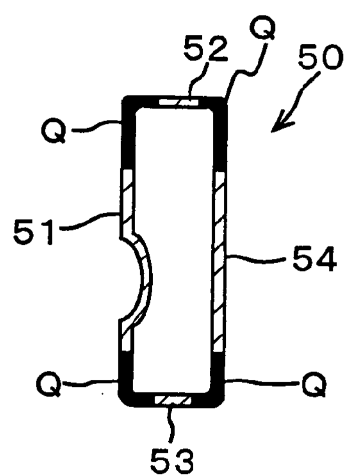
F I G. 1 5
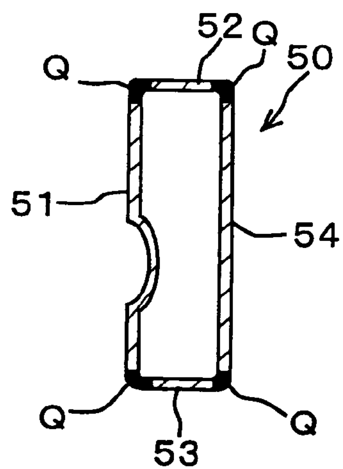

F I G. 2 0
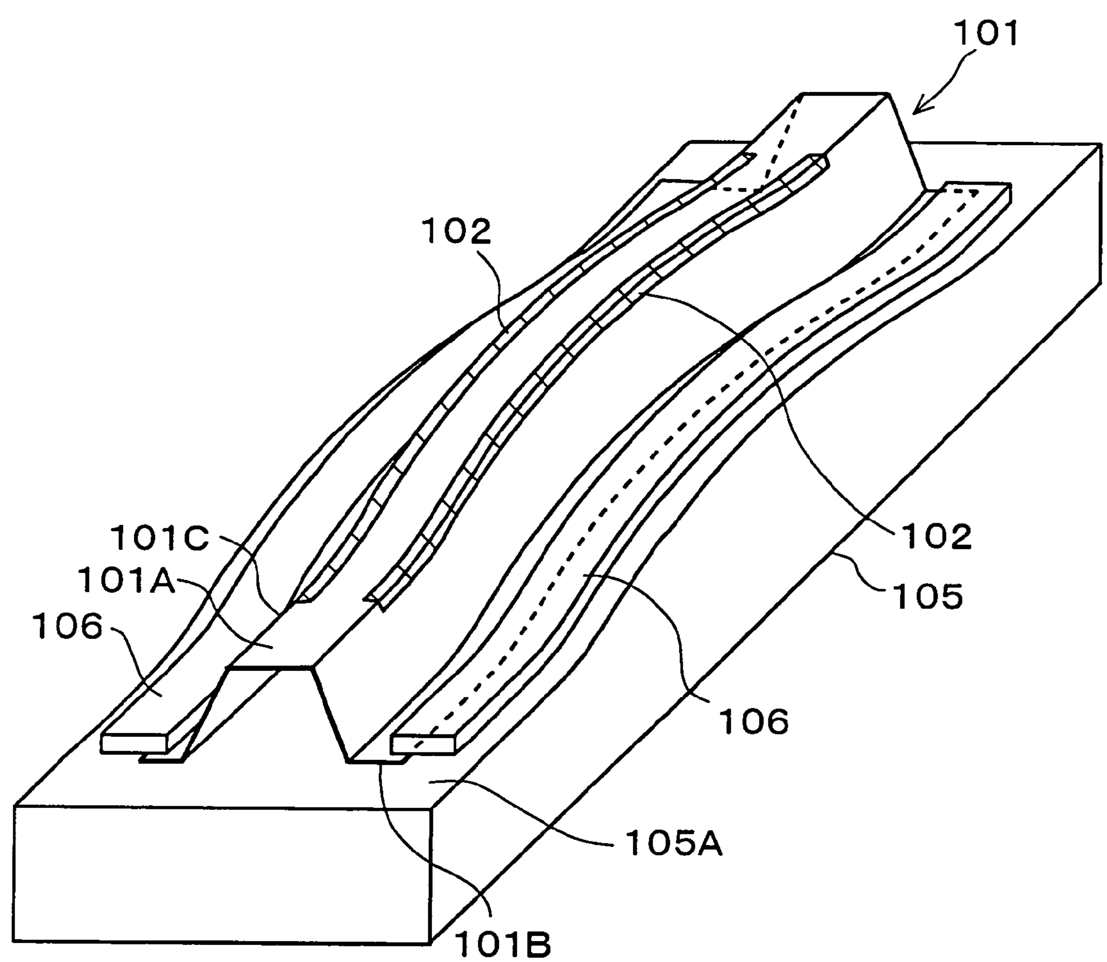

F I G. 2 1
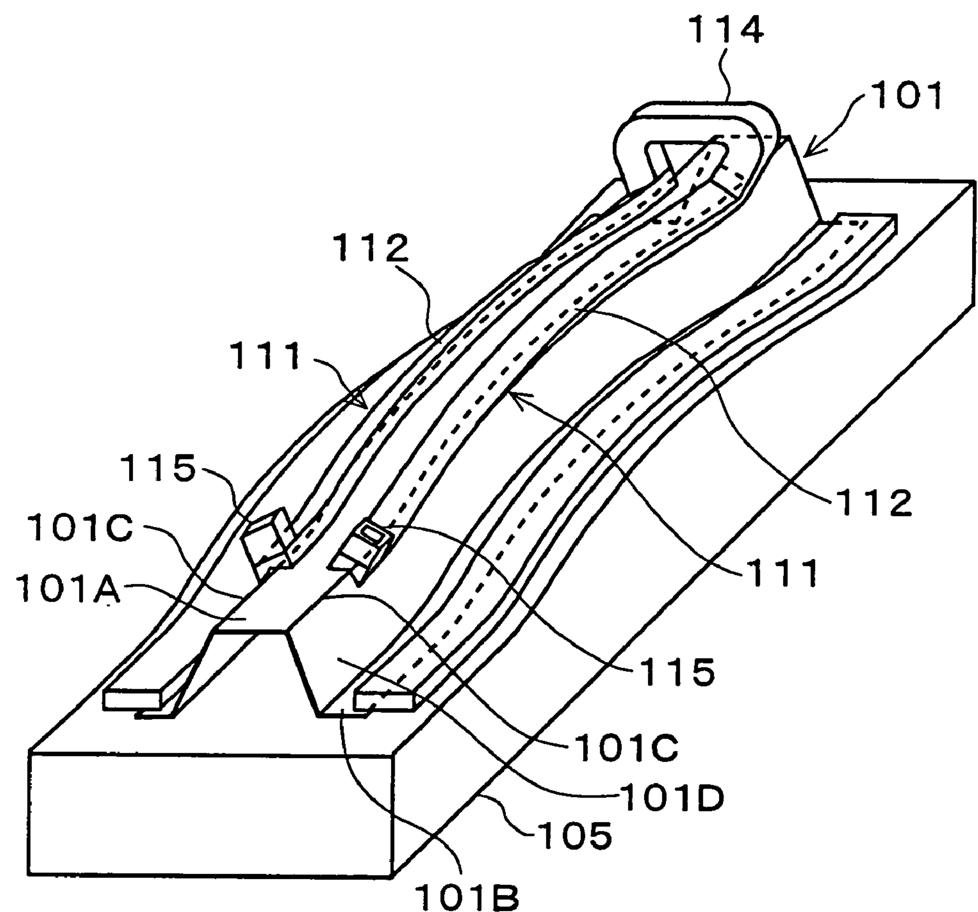
F I G. 2 2
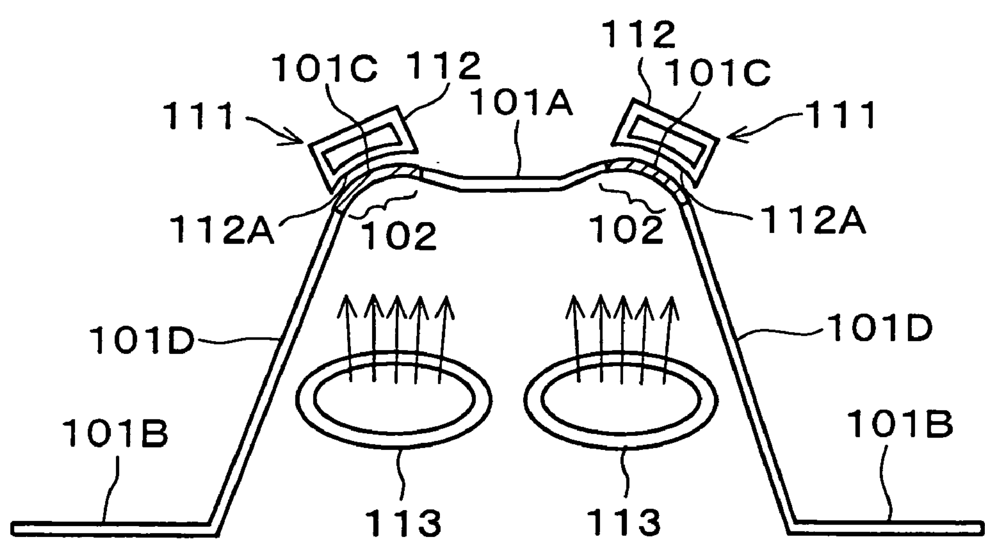

F I G. 2 3
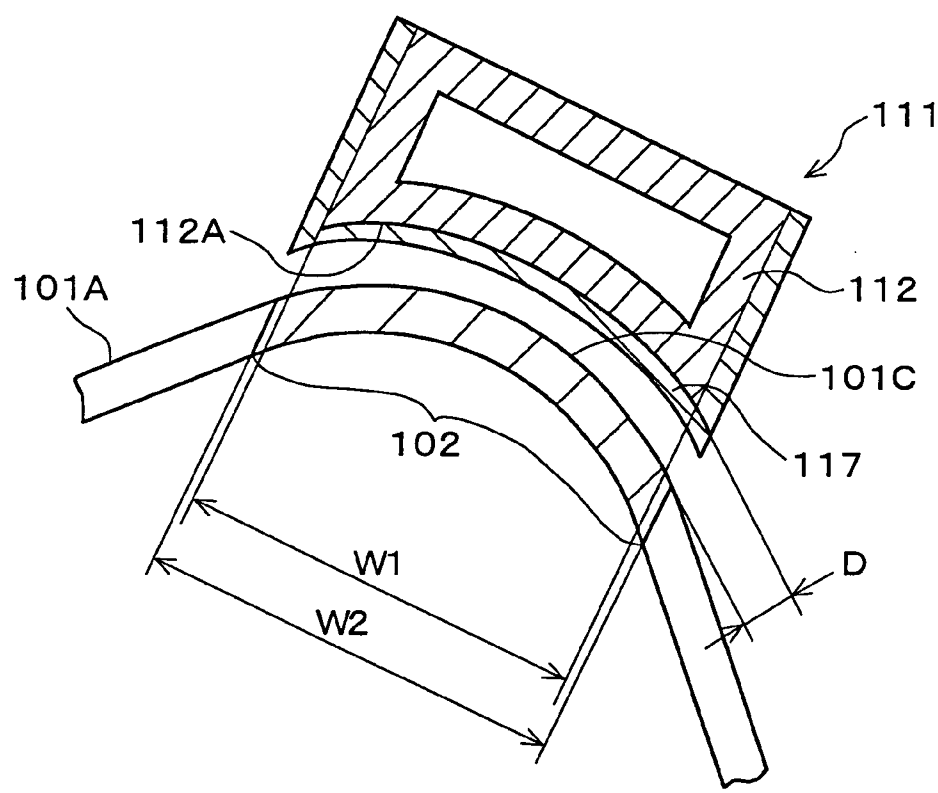
F I G. 2 4
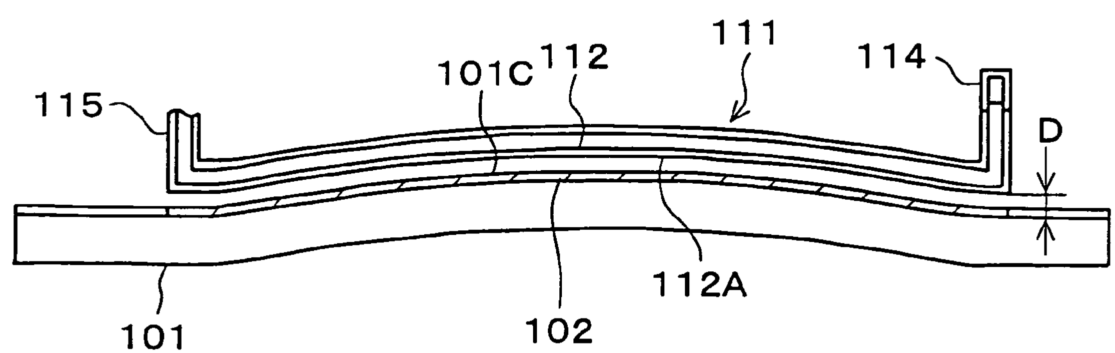

F I G. 2 5
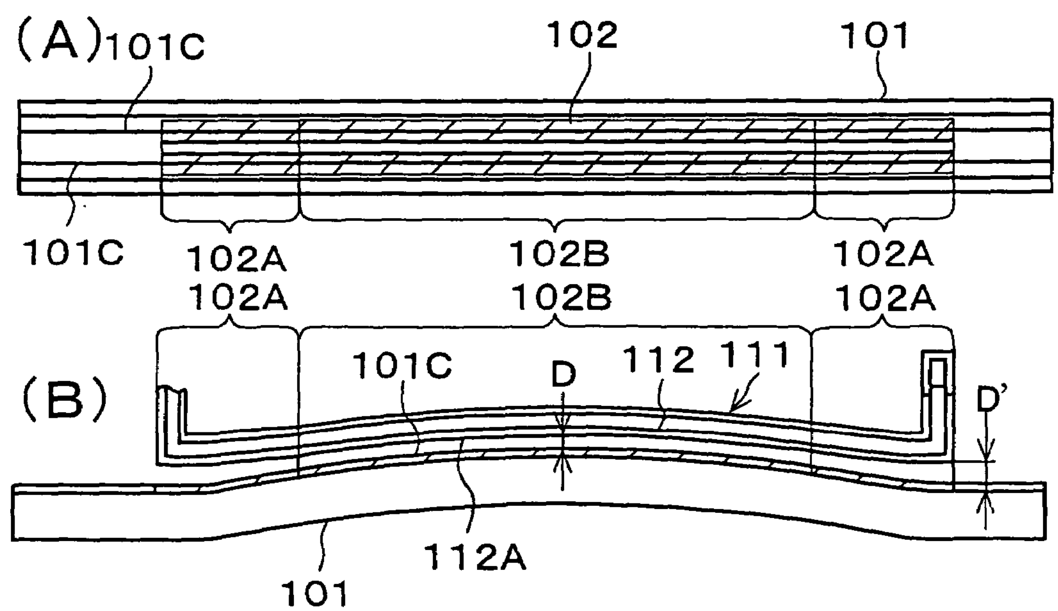
F I G. 2 6
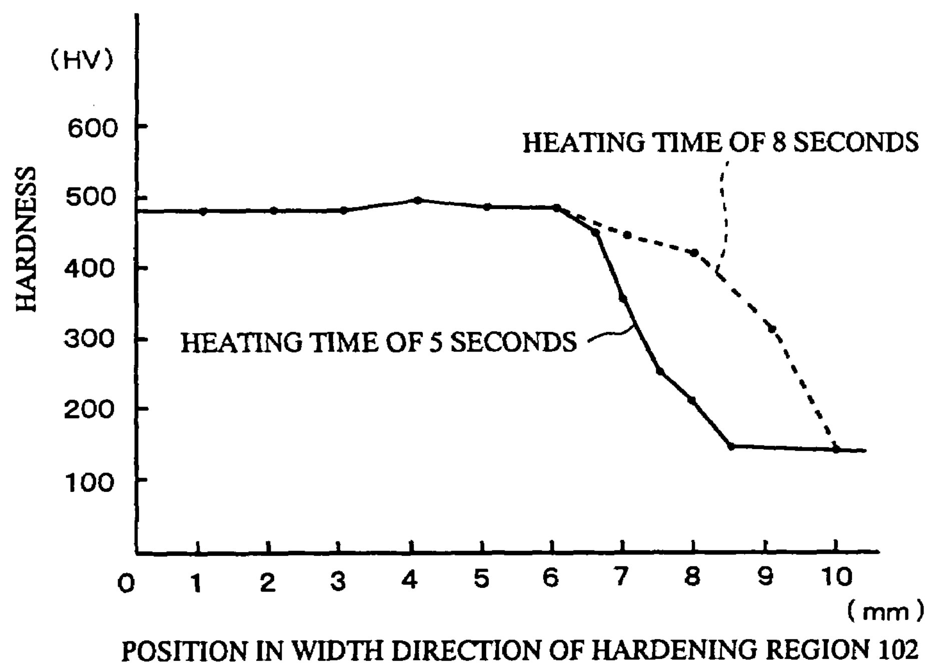

F I G. 2 7
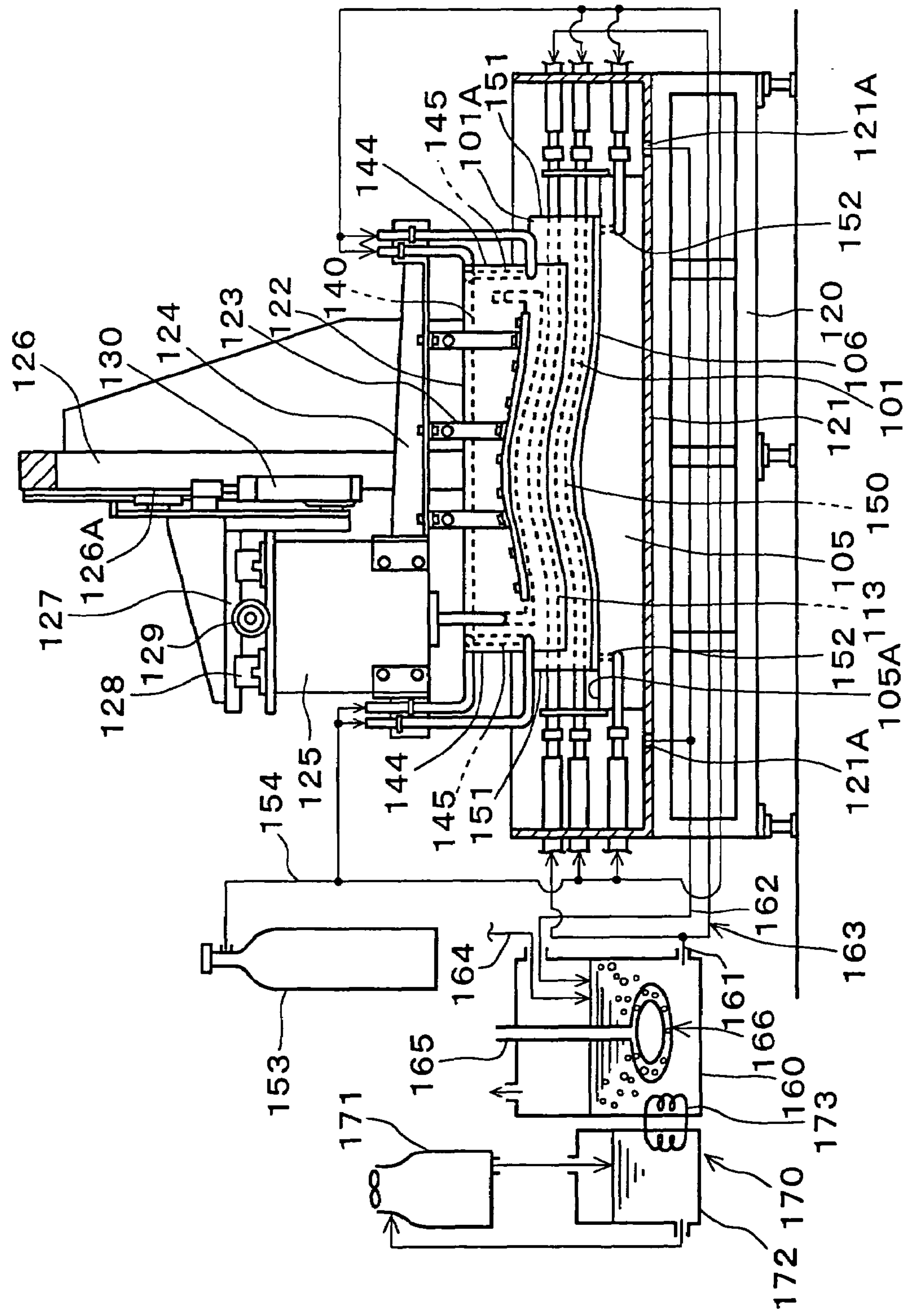

F I G. 2 8
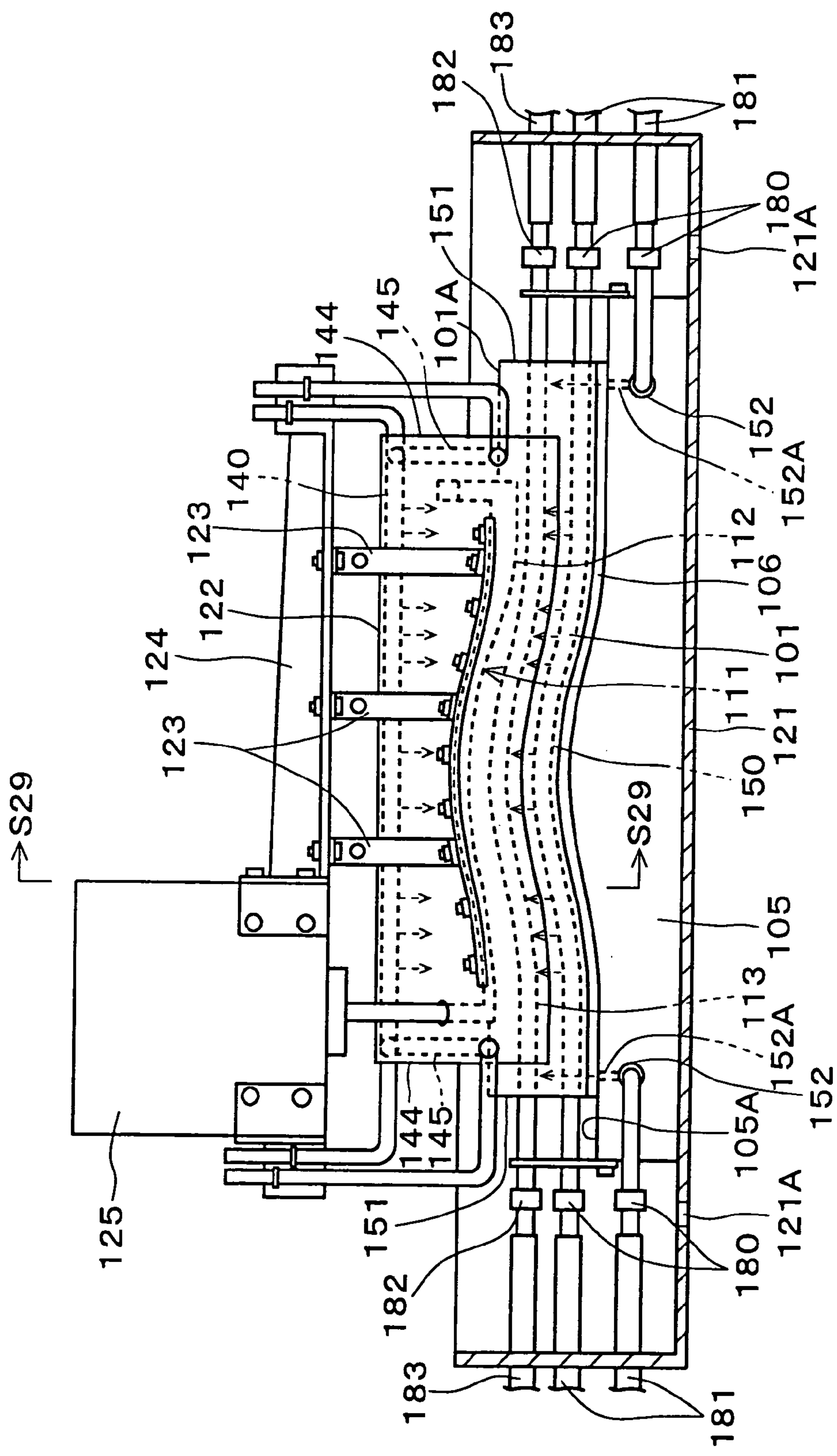

F I G. 2 9
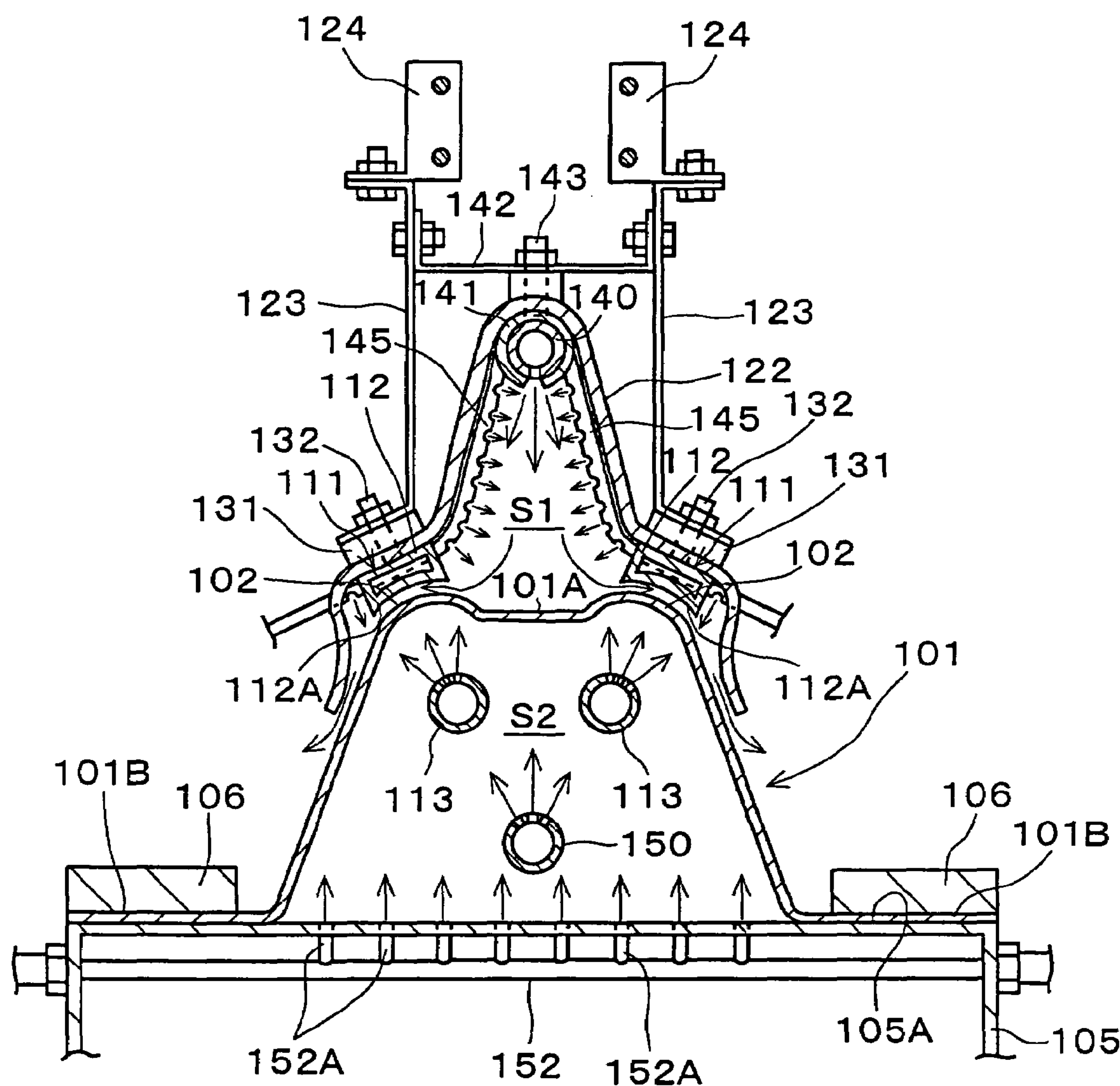

PRESS MOLDING AND ITS HIGH FREQUENCY QUENCHING METHOD AND ITS HIGH FREQUENCY QUENCHING SYSTEM

TECHNICAL FIELD

The present invention relates to a press formed article which has been subjected to hardening treatment, and an induction hardening method and an induction hardening apparatus therefor, and is applicable to, for example, various kinds of press formed articles such as a center pillar, a front bumper beam, a front side frame, a door reinforcing material, and so on of a vehicle.

BACKGROUND ART

A center pillar, which is a vehicle body part forming a part of a vehicle body of a four-wheel vehicle and is a column between a front seat and a back seat, is formed to have a cross section in the form of a hat by the press forming of a sheet metal. Specifically, the center pillar is a press formed article and is composed of: an intermediate top portion which extends in a longitudinal direction which is also a vertical direction; a pair of blade portions which are both bent from the intermediate top portion toward the inside of the vehicle in a direction perpendicular to the longitudinal direction within the surface of the intermediate top portion, that is, on both sides in a front-and-rear direction of the vehicle, and extend in the longitudinal direction, with a direction of the bend being a direction of the width thereof; and flange portions which extend in the front-and-rear direction of the vehicle away from each other, from tips of the blade portions. This center pillar is formed in an elongated shape having a small dimension of the width in the front-and-rear direction of the vehicle to ensure a wide field of vision from the cabin through the window glass of a side door, but required a high strength for measures against a side collision with other vehicles, walls, and so on.

To increase the strength of the center pillar, there are well-known conventional ways such as the provision of a reinforcement such as a reinforcing material at the center pillar, or hardening treatment on the center pillar.

The former way results in an increase in the whole weight of the center pillar and is against the demand for a smaller vehicle weight, and accordingly, the latter way is more preferable. In the latter way, when performing hardening treatment on the center pillar, it is desirable to perform hardening treatment to be able to achieve a demanded strength distribution by providing a high strength at a position where the high strength is required and to provide a low strength at a position where the low strength is sufficient, in order to effectively receive a load acting on the center pillar.

Japanese Patent Laid-Open No. Hei 10-17933 is well known as a prior art method of performing such a hardening treatment. In this prior art method, a hardening treatment is performed on the center pillar across the entire width in the front-and-rear direction of the vehicle by an induction hardening apparatus. By this hardening treatment, the hardness distribution in the vertical direction is made to correspond to a demanded strength distribution. In order to achieve such a hardness distribution, when the hardening treatment is performed while moving the induction hardening apparatus with respect to the center pillar, the moving speed is changed.

In this prior art, the way for achieving the demanded strength distribution is to create in the center pillar a hardness distribution corresponding to the strength distribution. To achieve such a hardness distribution corresponding to the strength distribution requires a high level technology including control technology in consideration of various kinds of conditions such as a material and so on of the center pillar.

It is an object of the present invention to provide a press formed article such as a center pillar or the like whose demanded strength distribution can be easily achieved by hardening treatment, and to provide an induction hardening method and an induction hardening apparatus for use in producing this press formed article.

DISCLOSURE OF THE INVENTION

A press formed article according to the present invention is a press formed article including: an intermediate top portion which extends in a longitudinal direction; and a pair of blade portions which are both bent from the intermediate top portion on both sides in a direction perpendicular to the longitudinal direction within a surface of the intermediate top portion, and extend in the longitudinal direction, with a direction of the bend being a direction of the width thereof, characterized in that a hardening region where hardening has been performed and a non-hardening region where hardening has not been performed are provided within at least the pair of blade portions out of the intermediate top portion and the pair of blade portions, and that an area ratio between the hardening region and the non-hardening region in the width direction is a ratio for achieving a demanded strength.

In this press formed article, the hardening region and non-hardening region are provided within at least the pair of blade portions out of the intermediate top portion and the pair of blade portions, and the area ratio between the hardening region and the non-hardening region in the width direction is a ratio for achieving a demanded strength. Therefore, the degree of strength can be determined by the setting of the ratio between the hardening region and the non-hardening region, so that a demanded strength distribution can be easily achieved. Further, the non-hardening region can ensure a tenacity corresponding to the ratio of the non-hardening region to the hardening region.

In this press formed article, when the strength is not changed in the longitudinal direction of the press formed article to make the strength distribution uniform in the longitudinal direction, the ratio between the hardening region and the non-hardening region does not need to be changed in the longitudinal direction of the press formed article. On the other hand, when the strength is changed in the longitudinal direction of the press formed article to make the strength distribution not uniform, the ratio between the hardening region and the non-hardening region only needs to be changed in the longitudinal direction of the press formed article. In the latter case, it is also possible to provide a portion which is made a hardening region or a non-hardening region, at a part in the longitudinal direction of the press formed article.

Further, the hardening region may also be provided in the intermediate top portion. When the hardening region is provided also in the intermediate top portion as described above, the hardening region may be provided over the whole intermediate top portion in the direction perpendicular to the longitudinal direction within the surface of the intermediate top portion, or the hardening region may be provided only on both sides of the intermediate top portion in the direction, and a non-hardening region may be provided between the hardening regions.

According to the latter, the non-hardening region can ensure the tenacity of the press formed article. Further, the non-hardening region can also be formed with a hole. It should be noted that when the hardening energy in hardening is in no danger of concentrating to the surroundings of the hole, the hole may be provided in the hardening region. Further, in this case, the non-hardening region does not need to be provided in the intermediate top portion.

Further, a press formed article according to the present invention is a press formed article including: an intermediate top portion which extends in a longitudinal direction; and a pair of blade portions which are both bent from the intermediate top portion toward the same side on both sides in a direction perpendicular to the longitudinal direction within a surface of the intermediate top portion, and extend in the longitudinal direction, with a direction of the bend being a direction of the width thereof, characterized in that a hardening region where hardening has been performed and a non-hardening region where hardening has not been performed are provided within at least the intermediate top portion out of the intermediate top portion and the pair of blade portions, and that an area ratio between the hardening region and the non-hardening region in the direction perpendicular to the longitudinal direction within the surface of the intermediate top portion is a ratio for achieving a demanded strength.

In this press formed article, the hardening region and non-hardening region are provided within at least the intermediate top portion out of the intermediate top portion and the pair of blade portions, and the degree of the strength can be determined by the setting of the area ratio between the hardening region and the non-hardening region in the direction perpendicular to the longitudinal direction within the surface of the intermediate top portion, so that a demanded strength distribution can be easily achieved also in this press formed article by the setting of the ratio between the hardening region and the non-hardening region. Further, the non-hardening region can ensure a tenacity corresponding to the ratio of the non-hardening region to the hardening region.

Also in this press formed article, the strength does not need to be changed in the longitudinal direction of the press formed article by not changing the ratio between the hardening region and the non-hardening region in the longitudinal direction of the press formed article. Alternatively, the strength may be changed in the longitudinal direction of the press formed article by changing the ratio between the hardening region and the non-hardening region in the longitudinal direction of the press formed article. In the latter case, it is also possible to provide a portion which is made a hardening region or a non-hardening region, at a part in the longitudinal direction of the press formed article.

Further, the hardening region to be provided in the intermediate top portion may be provided only on both sides in the direction perpendicular to the longitudinal direction within the surface of the intermediate top portion, and the non-hardening region may be provided between the hardening regions.

The non-hardening region can ensure tenacity of the press formed article. Further, the non-hardening region can also be formed with a hole. It should be noted that, also in this press formed article, when the hardening energy in hardening is in no danger of concentrating to the surroundings of the hole, the hole may be provided in the hardening region.

A first example of the press formed article to be subjected to hardening treatment as described above is a center pillar of a vehicle. It is preferable to provide the hardening region at a portion of the center pillar corresponding to a window hole for inserting therein a window glass in a side door of the vehicle.

According to this, a demanded strength against a side collision with other vehicles, walls, and so on, can be imparted to a portion of the center pillar which is small in the width dimension in the front-and-rear direction of the vehicle to ensure a wide vision from the cabin through the window glass of the side door.

Further, the hardening region of the center pillar may be a region having a uniform strength distribution from an upper portion to a lower portion, and may also be a region in the form, widening toward an end, which continuously expands from an upper portion to a lower portion.

According to the latter, the strength of a point receiving a large side collision load from other vehicles and so on can be made high, and the collision energy can be effectively absorbed by a portion which is higher than the point and whose strength gradually decreases. Further, the hardening region continuously expands and has no portion sharply changing in shape. Therefore, the strength distribution neither changes sharply to prevent the center pillar from being folded when receiving a collision load from other vehicles and so on.

It should be noted that the shape of the hardening region of the center pillar is not limited to the above but is, for example, a region in the form, widening toward an end, which continuously expands from a lower portion to an upper portion in accordance with the strength of the vehicle body based on the internal structure of the vehicle, or a discontinuous region in which the hardening region is removed at points to which side door hinges are attached.

The center pillar, in which a portion corresponding to a window hole for inserting therein a window glass in the side door is subjected to hardening treatment, may be provided with reinforcement at an upper portion and a lower portion of the hardening region. The reinforcement provided at the upper portion of the hardening region can ensure a great strength of joining with roof portions of other members which constitute the vehicle body. The reinforcement provided at the lower portion of the hardening region can increase the strength of points to which side door hinges are attached.

Note that depending on the kind of a vehicle using the center pillar in which the portion corresponding to the window hole for inserting therein a window glass in the side door is subjected to hardening treatment as described above, one reinforcement out of the reinforcement provided at the upper portion and the lower portion of the hardening region, for example, the upper reinforcement, may be omitted.

Further, the center pillar may be provided with a reinforcement having the same or almost the same length as that of the range in the longitudinal direction of the center pillar provided with the hardening region. According to this, the whole weight of the center pillar increases, but the whole strength of the center pillar can be made higher by the increment of strength resulting from the hardening treatment than that of another center pillar having the same whole weight.

A second example of the press formed article to be subjected to hardening treatment is a front bumper beam of a vehicle. It is preferable that the hardening region of the front bumper beam is made large at combined portions on both right and left sides to which tips of right and left front side frames of the vehicle are combined, and is gradually decreased toward a middle portion between the right and left sides.

According to this, when a light collision load acts on the middle portion of the front bumper beam having a whole shape in the form of a bow in which the middle portion between the right and left sides bulges forward, the load can be effectively received by the middle portion which is not so high in strength but is high in tenacity. A large collision load can be effectively received by the right and left combined portions which have high strengths and to which the front side frames are combined.

A third example of the press formed article to be subjected to hardening treatment is a front side frame of a vehicle whose tip portion is combined to a front bumper beam. It is preferable that the hardening region of the front side frame is made large at the tip portion and at a portion at a position retreating from the tip portion with an interval therefrom, and is small at a middle portion therebetween.

According to this, when a large collision load from the front bumper beam acts on the front side frame, the middle portion having a low strength can be a buckling point where buckling is caused, so that its collision energy can be effectively absorbed by the front side frame owing to the buckling point.

It should be noted that the shape of the hardening region provided in the front side frame is not limited to the above and is arbitrary, and by arbitrarily setting the shape of the hardening region, the position of the buckling point can be set arbitrarily.

In addition to the above, the press formed article to be subjected to hardening treatment may be a reinforcing member for a side door of a vehicle or a reinforcing member for a back door, also called a tail gate, or may be side sills joined to right and left end portions of a front floor, a rear side frame, or a rear side frame reinforcement. Further, when a reinforcement is provided at the center pillar, this reinforcement may be applied, and accordingly, the press formed article to which the present invention is applied may be an arbitrary press formed article.

Further, the press formed article related to the present invention may be a press formed article for other than a vehicle, for example, for an electrical appliance.

Further, the hardening apparatus for performing hardening treatment on the press formed article may be an induction hardening apparatus, a laser hardening apparatus, a gas flame hardening apparatus, and thus may be an arbitrary type hardening apparatus.

An induction hardening method for a press formed article according to the present invention is characterized by including: a first step of manufacturing a press formed article including: an intermediate top portion which extends in a longitudinal direction, and a pair of blade portions which are both bent from the intermediate top portion in a direction perpendicular to the longitudinal direction within a surface of the intermediate top portion, and extend in the longitudinal direction, with a direction of the bend being a direction of the width thereof; a second step of heating a hardening region by at least one inductive conductor of a heating inductor for induction hardening having a size capable of heating the whole of the hardening region at once to provide the hardening region where hardening has been performed, and a non-hardening region where hardening is not performed, at an area ratio for achieving a demanded strength, within at least the intermediate top portion out of the intermediate top portion and the pair of blade portions of the press formed article; and a third step of rapidly cooling the hardening region to thereby perform induction hardening on the hardening region.

According to this induction hardening method, since at least one inductive conductor of a heating inductor for induction hardening has a size capable of heating the whole of the hardening region at once, the induction hardening can be performed in a short time by quickly heating the whole of the hardening region by the inductive conductor and rapidly cooling the hardening region, resulting in achievement of improved efficiency of the hardening operation.

In this induction hardening method, the dimension of the inductive conductor in the direction perpendicular to the longitudinal direction does not need to be changed or may be changed in the longitudinal direction. When it is changed, for this change, the area ratio between the hardening region where induction hardening has been performed and the non-hardening region where hardening is not performed can be changed in the longitudinal direction, so that a press formed article can be obtained in which the strength distribution is changed in the longitudinal direction.

When a hole needs to be provided in the intermediate top portion at a middle portion between both sides in the direction perpendicular to the longitudinal direction within a surface of the intermediate top portion, this hole is formed in the step of manufacturing the press formed article, and thereafter positions on both sides of the intermediate top portion in the direction perpendicular to the longitudinal direction within the surface of the intermediate top portion and other than the hole, are heated by two inductive conductors of the heating inductor for induction hardening.

According to this, the positions subjected to the induction hardening are provided away from the position where the hole is formed, and therefore induction hardening energy never concentrates to the surroundings of the hole in induction heating by the inductive conductors to prevent generation of unevenness in hardening. It should be noted that when the induction hardening energy is in no danger of concentrating to the surroundings of the hole, the position where the hole is formed may also be heated.

An induction hardening apparatus for a press formed article according to the present invention is characterized by including: at least one inductive conductor of a heating inductor for induction hardening for providing a hardening region where hardening has been performed within at least an intermediate top portion out of the intermediate top portion and a pair of blade portions in a press formed article including the intermediate top portion which extends in a longitudinal direction, and the pair of blade portions which are both bent from the intermediate top portion in a direction perpendicular to the longitudinal direction within a surface of the intermediate top portion, and extend in the longitudinal direction, with a direction of the bend being a direction of the width thereof; a power supply device for applying a high frequency current to the heating inductor for induction hardening; and a cooler for rapidly cooling the hardening region which has been inductively heated by the inductive conductor, wherein the inductive conductor has a size capable of heating the whole of the hardening region at once, and the size of the inductive conductor is a size for achieving a demanded strength by an area ratio between the hardening region where induction hardening has been performed by the inductive conductor and the cooler and a non-hardening region where hardening is not performed.

According to this induction hardening apparatus, since at least one inductive conductor of a heating inductor for induction hardening has a size capable of heating the whole of the hardening region at once, the whole of the hardening region can be quickly heated by the inductive conductor, and the hardening region is rapidly cooled, whereby the induction hardening can be performed in a short time, resulting in efficient performance of the hardening operation.

The cooler in the induction hardening apparatus may be an apparatus for spraying a cooling medium such as cooling water or the like to at least the hardening region of the press formed article, or may be an apparatus for immersing the whole press formed article in a cooling liquid. In the case of the apparatus for spraying the cooling medium, the cooler can be simplified.

Further, in this induction hardening apparatus, the dimension of the inductive conductor in the direction perpendicular to the longitudinal direction does not need to be changed or may be changed in the longitudinal direction. When it is changed, for this change, the area ratio between the hardening region where induction hardening has been performed and the non-hardening region where hardening has not been performed is changed in the longitudinal direction, so that a press formed article can be manufactured in which the strength distribution is changed in the longitudinal direction.

Further, it is preferable that the inductive conductor of the heating inductor and a feed line used in this hardening apparatus are composed of a hollow cylindrical conductor and inside thereof is a cooling water passage. According to this, the inductive conductor and so on can be cooled by a simple structure.

It is preferable that an inductive face of the heating inductor is provided with an insulating coating. This makes it possible to prevent short circuiting, even though the heating inductor accidentally touches the hardening region when the heating inductor is disposed closely and opposed to the hardening region of the intermediate top portion in the press formed article, leading to safety.

Further it is also recommendable to dispose on the inductive face of the heating inductor a spacer for controlling the distance with respect to the hardening region. The provision of such a spacer allows the opposing distance between the inductive face of the heating inductor and the hardening region to be a desired value when the heating inductor is disposed closely and opposed to the hardening region, only by disposing the heating inductor in such a manner to push it to the hardening region through the spacer, thereby facilitating the operation of disposing the heating inductor.

Further, the spacer is made of an insulating material to contribute to enhancement of insulation between the inductive conductor and the hardening region.

Further, the number of the heating inductors in the width direction of the hardening region may be one, or plural side by side in the width direction, in accordance with the width dimension of the hardening region. Further, the latter may be realized by turning back an elongated heating inductor at end portions in the longitudinal direction of the hardening region to reciprocate in the longitudinal direction. According to this, the power supply device for supplying electricity to the heating inductor can be one in number.

It is preferable that the cooler is disposed on a side opposite to the heating inductor with respect to front and rear sides of the press formed article, and has a configuration provided with a cooling pipe for spraying a cooling medium to the whole of the hardening region at once. This configuration enables cooling without interfering with the heating inductor. In addition, the whole of the hardening region can be cooled in a short time and uniformly.

Note that it is also possible to arrange the inside of the heating inductor to be a passage in which the cooling medium flows to spray the cooling medium from the heating inductor to the press formed article. According to this, the heating inductor can be also used as the cooler. Further the arrangement of the inside of the heating inductor having a passage in which the cooling medium flows can also be implemented in the case of a cooling pipe for spraying the cooling medium being provided on the side opposite to the heating inductor with respect to front and rear sides of the press formed article as described above.

If the cooling medium is a liquid such as cooling water or the like, this cooling liquid is sprayed to the hardening region and thereafter flows outside the press formed article. Therefore, it is preferable that the press formed article is disposed inside a pan for receiving the cooling liquid sprayed onto the hardening region and flowing outside the press formed article. This facilitates treatment of the cooling liquid after cooling the hardening region.

Further, it is also preferable that the pan forms a part of a circulation path for circulating therein the cooling liquid. This enables reuse of the cooling liquid. In such a case of reuse of the cooling liquid, a part of the cooling liquid is lost due to evaporation accompanying the spraying onto the hardening region heated to high temperature. Therefore, a cooling liquid replenishing pipe may be provided along the circulation path to be able to replenish the lost cooling liquid.

Further, it is preferable that the circulation path is provided with a dissolved oxygen removing means for removing oxygen dissolved in the cooling liquid circulating in the circulation path. According to this, since the cooling liquid sprayed onto the hardening region has the dissolved oxygen removed, hardening can be performed with the prevention of oxidation on the side of a face sprayed with the cooling liquid in the hardening region, so that a post-operation for the coating and so on conducted on the press formed article after hardening, can be conducted as predetermined.

An example of the dissolved oxygen removing means is designed to include a blow pipe for blowing an anti-oxidation gas such as nitrogen gas or the like into the cooling liquid stored in a storage tank, so that the blow removes dissolved oxygen dissolved in the cooling liquid.

Note that the dissolved oxygen removing means is not limited to one for completely removing the dissolved oxygen from the cooling liquid, but may be one capable of removing the dissolved oxygen from the cooling liquid to a degree at which the post-operation to be conducted after hardening can be conducted without trouble.

If the above-described post-operation for the coating and so on is conducted after hardening, it is preferable that the hardening apparatus is provided with an anti-oxidation gas supply means for performing hardening of the hardening region in an anti-oxidation gas atmosphere. This makes it possible to harden the hardening region with prevention of oxidation, so that the post-operation can be conducted as predetermined.

When an inside space of the elongated intermediate top portion of the press formed article is in the anti-oxidation gas atmosphere, and at least one end portion out of both end portions in a longitudinal direction along the intermediate top portion of the inside space is open to be an open end, it is preferable that an anti-oxidation gas jet means is provided at the open end to form a gas curtain made of an anti-oxidation gas at the open end.

According to this, the gas curtain can prevent the anti-oxidation gas supplied from the anti-oxidation gas supply means into the inside space of the intermediate top portion from flowing out from the open end so as to keep the anti-oxidation gas atmosphere in this inside space. Further, also in the case of spraying the cooling liquid in the inside space, the cooling liquid after the spraying is allowed to flow out from the open end.

When the hardening apparatus is provided with a cover for covering an outside of the press formed article, with a distance space between the cover and the press formed article being in the anti-oxidation gas atmosphere, and at least one end portion out of both end portions in a longitudinal direction along the intermediate top portion of the distance space is open to be an open end; it is preferable that an anti-oxidation gas jet means is provided at the open end to form a gas curtain made of an anti-oxidation gas at the open end.

According to this, the gas curtain can prevent the anti-oxidation gas supplied from the anti-oxidation gas supply means into the distance space from flowing out from the open end so as to keep the anti-oxidation gas atmosphere in this distance space.

In the above description, “anti-oxidation” of the anti-oxidation gas is not limited to the meaning of completely preventing the oxidation of the hardening region, but also includes the meaning of suppressing the oxidation to a low level, and thus oxidation at a level at which the post-operation can be conducted as predetermined is allowable.

Further, after the hardening region is heated by application and stoppage of the current to the inductive conductor of the heating inductor for induction hardening, spraying and stopping of the cooling liquid from the cooling pipe to the hardening region may be conducted. Alternatively, after start of the spraying of the cooling liquid from the cooling pipe to the hardening region, application and stoppage of current to the inductive conductor may be conducted, and subsequently the spraying of the cooling liquid may be stopped.

Further, it is also possible that the pan is a water tank fully storing therein the cooling liquid having dissolved oxygen removed, and the press formed article is set in this water tank in a manner so as to be submerged therein, and in this state, hardening may be performed on the hardening region by application of current to the inductive conductor. In this arrangement, the anti-oxidation gas supply means becomes unnecessary.

Furthermore, the hardening apparatus may be an apparatus provided with a chamber fully filled with an anti-oxidation gas in which hardening is performed on the press formed article. Moreover, the hardening apparatus may be an apparatus provided with a standby chamber coupled to a chamber, so that a press formed article, which will be hardened next, stands by in this standby chamber for continuous hardening of a plurality of press formed articles.

The above-described present invention is applicable to manufacturing of a press formed article from a steel sheet having an arbitrary tensile strength. This tensile strength may be at the 441.29925 N/mm$^2$ level, 490.3325 N/mm$^2$ level, 588.399 N/mm$^2$ level, 686.4655 N/mm level, or 784.532 N/mm$^2$ level.

However, when using, as a material of the press formed article, a steel sheet at the 441.29925 N/mm$^2$ level in tensile strength, this tensile strength being not so high, a product in a complex shape can be manufactured by press working. Therefore, even if a press formed article to be manufactured is in a complex shape, this press formed article can be manufactured as predetermined by press working.

Further, when using, as a material of the press formed article, a steel sheet at the 441.29925 N/mm$^2$ level in tensile strength, the hardening temperature can be a relatively low temperature, 900° C. or lower, for example, a temperature within a range from 750° C. to 900° C. In particular, when a hardening temperature is within a range from 800° C. to 850° C., this hardening temperature never breaks a galvanized layer of a galvanized steel sheet as well as can ensure a predetermined strength by the hardening. This makes it possible to obtain also a strength required as a vehicle body part or the like using as the material of the press formed article the galvanized steel sheet which is effective against rust.

BRIEF DESCRIPTION OF DRAWINGS

FIG. 1 is a perspective view showing a side body on the left side out of right and left side bodies of a four-wheel vehicle in which a center pillar being a press formed article according to an embodiment of the present invention is used;

FIG. 2 is a cross-sectional view taken along a line S2—S2 in FIG. 1;

FIG. 3 is a front view of the whole center pillar which is shown on a relation with an inner panel out of an outer panel and the inner panel forming the side body in FIG. 1;

FIG. 4 is an essential portion enlarged view of the center pillar showing a portion subjected to hardening treatment;

FIG. 8 is a perspective view showing a general configuration of an induction hardening apparatus when set on the center pillar;

FIG. 9 is a view, similar to FIG. 2, showing an embodiment in which a reinforcement across a range in the longitudinal direction of the center pillar provided with the hardening regions is provided at the center pillar;

FIG. 10 is a perspective view showing a front bumper beam and a right and left pair of front side frames before combination;

FIG. 11 is a plan view showing the front bumper beam and the right and left pair of front side frames after the combination;

FIG. 12 is a side view showing the front bumper beam and the right and left pair of front side frames after the combination;

FIG. 13 is a cross-sectional view taken along a line S13—S13 in FIG. 11;

FIG. 14 is a cross-sectional view taken along a line S14—S14 in FIG. 11;

FIG. 15 is a cross-sectional view taken along a line S15—S15 in FIG. 11;

FIG. 20 is a schematic perspective view showing the state of the press formed article in FIG. 19 mounted on a support;

FIG. 21 is a schematic perspective view showing the state of the press formed article in FIG. 19 mounted on the support and a heating inductor for induction hardening disposed closely to the press formed article;

FIG. 22 is a schematic cross-sectional view showing the state of the heating inductor for induction hardening disposed closely to a hardening region set in the press formed article in FIG. 19 and cooling pipes disposed inside the heating inductor;

FIG. 23 is a schematic cross-sectional view of a ridge portion of the press formed article in FIG. 19 and the heating inductor for induction hardening disposed closely thereto;

FIG. 24 is a schematic cross-sectional view showing the press formed article and the heating inductor in FIG. 23, cut along the ridge portion;

FIG. 25A is a schematic plan view of the press formed article in FIG. 19, and FIG. 25B is a schematic cross-sectional view showing the press formed article and the heating inductor, cut along the ridge portion;

FIG. 26 is a graph showing hardness distributions within a hardening region which is subjected to hardening in Examples 1 and 2;

FIG. 27 is a side cross-sectional view showing a more specific embodiment of a hardening apparatus, a view showing it including a cooling water circulation path and a supply path of anti-oxidation gas;

FIG. 28 is an enlarged view of an essential portion in FIG. 27; and

FIG. 29 is a cross-sectional view taken along a line S29—S29 of FIG. 28.

BEST MODE FOR CARRYING OUT THE INVENTION

Figure 5:
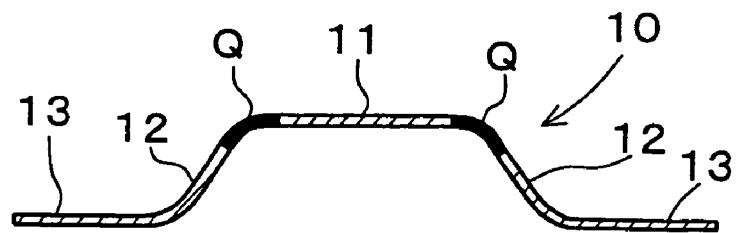
FIG. 5 is a cross-sectional view taken along a line S5—S5 in FIG. 4.

The present invention is described in more detail with reference to the accompanying drawings. FIG. 1 shows a side body 1 for the left side out of right and left side bodies of a four-wheel vehicle in which a center pillar being a press formed article according to an embodiment of the present invention is applied. The side body 1 is formed by joining an outer panel on the outside of the vehicle and an inner panel on the inside of the vehicle. In addition, in the side body 1, a center pillar 10 according to this embodiment is disposed in an inner space 4 which is formed by center pillar portions 2A and 3A, between a front seat and a rear seat, of an outer panel 2 and an inner panel 3 as shown in FIG. 2 which is a cross-sectional view taken along a line S2—S2 in FIG. 1.

This center pillar 10 is composed of: an intermediate top portion 11 which extends in a vertical direction and a longitudinal direction; a pair of blade portions 12 which are both bent from the intermediate top portion 11 toward the inside of the vehicle in a direction perpendicular to the vertical direction within the surface of the intermediate top portion 11, that is, on both sides in a front-and-rear direction of the vehicle, and extend in the vertical direction, with a direction of the bend being a direction of the width thereof; and flange portions 13 which extend in the front-and-rear direction of the vehicle away from each other from the tips of the blade portions 12. Therefore, the center pillar 10 has a cross section in the form of a hat.

FIG. 3 shows a front view of the whole center pillar 10, in which the inner panel 3 is shown with the outer panel 2 removed. Upper and lower end portions of the center pillar 10 are formed with bulge portions 14 and 15 which bulge out in the front-and-rear direction of the vehicle, and as a result, the whole shape of the center pillar 10 is an almost I shape. The center pillar 10 to be installed between the outer panel 2 and the inner panel 3 is combined to the outer panel 2 and the inner panel 3 by joining the upper and lower bulge portions 14 and 15 to a roof portion and a floor portion of the outer panel 2 and to a roof portion 3C and a floor portion 3D of the inner panel 3, and joining the flange portions 13 shown in FIG. 2 to a flange portion 2B of the center pillar portion 2A of the outer panel 2 and to a flange portion 3B of the center pillar portion 3A of the inner panel 3, respectively by spot welding.

Further, as shown in FIG. 3, reinforcements 16 and 17 are disposed at the upper portion of the center pillar 10 and at an almost middle portion or at a portion slightly lower than that in the vertical direction, and the reinforcements 16 and 17 are joined to the center pillar 10 by spot welding.

As shown in FIG. 2, the intermediate top portion 11 of the center pillar 10 is formed with a hole 18. A plurality of holes 18 are provided in the longitudinal direction of the intermediate top portion 11 as shown in FIG. 3. These holes 18 are provided for the purpose that when the side body 1, which is formed by the outer panel 2, the inner panel 3, the center pillar 10, the reinforcements 16 and 17, and other necessary parts, is immersed in an electro-deposition coating liquid for electro-deposition coating, the electro-deposition coating liquid entering the inner space 4 which is formed by the center pillar portions 2A and 3A of the outer panel 2 and the inner panel 3 is securely caused to enter a narrow gap 5 between the center pillar portion 2A of the outer panel 2 and the center pillar 10 so that the inner face of the center pillar portion 2A of the outer panel 2 can be securely electro-deposition coated as predetermined.

In the above arrangement, the center pillar 10 is manufactured by transfer pressing a non-plated steel sheet or a galvanized steel sheet 11.0 mm, 1.2 mm, 1.4 mm, or 1.6 mm in thickness and 441.29925 N/mm$^2$ in tensile strength, and in manufacturing by this transfer press work, the holes 18 are formed by punching.

Figure 6:
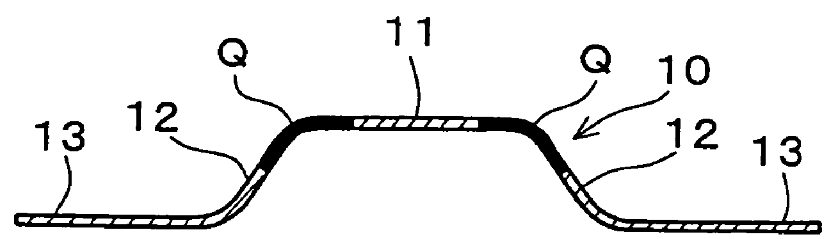
FIG. 6 is a cross-sectional view taken along a line S6—S6 in FIG. 4.
Figure 7:
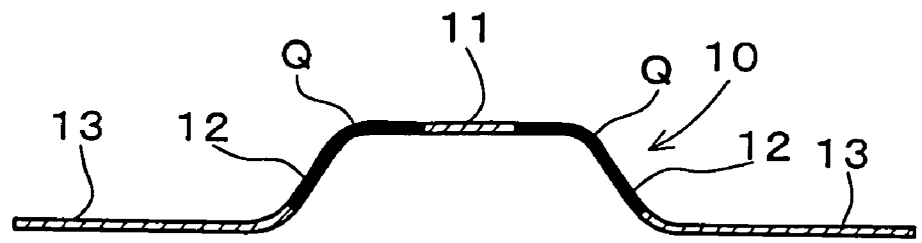
FIG. 7 is a cross-sectional view taken along a line S7—S7 in FIG. 4.

FIG. 4 is an essential portion enlarged view showing a portion which is to be subjected to hardening treatment of the center pillar 10 formed with the holes 18 as described above. Hardening regions Q whose outlines are shown by two-dotted chain lines 19 are provided between the reinforcements 16 and 17, partially overlapping the reinforcements 16 and 17. FIG. 5 is a cross-sectional view taken along a line S5—S5 in FIG. 4, FIG. 6 is a cross-sectional view taken along a line S6—S6 in FIG. 4, and FIG. 7 is a cross-sectional view taken along a line S7—S7 in FIG. 4. As understood by FIG. 4 to FIG. 7, the hardening regions Q are provided in the intermediate top portion 11 and the pair of blade portions 12, and are regions in the form, widening toward the end, which continuously expands from the upper portion to the lower portion, in the intermediate top portion 11 and the pair of blade portions 12.

Besides, as shown in FIG. 4, the hardening regions Q are provided in a portion of the center pillar 10 corresponding to a window hole for inserting therein a window glass 20 (see also FIG. 3) provided in a side door of the vehicle.

In this embodiment, the hardening regions Q are provided at two positions in the front-and-rear direction of the vehicle. Regions at the intermediate top portion 11 of the hardening regions Q are provided on both sides in the direction perpendicular to the longitudinal direction of the center pillar 10 within the surface of the intermediate top portion 11, in other words, on both sides in the front-and-rear direction of the vehicle, and these regions continue to regions in the respective blade portions 12 of the hardening regions Q.

The holes 18 shown in FIG. 4 are provided between the regions which are formed on both sides in the front-and-rear direction of the vehicle in the intermediate top portion 11 of the two hardening regions Q provided separately in the front-and-rear direction of the vehicle.

Within the intermediate top portion 11 and the pair of blade portions 12, portions other than the hardening regions Q are non-hardening regions where hardening is not performed. As described above, since the hardening regions Q are in the form, widening toward the end, which continuously expands from the upper portion to the lower portion, the non-hardening regions are conversely in a tapered shape which continuously decreases from an upper portion to a lower portion. Accordingly, the intermediate top portion 11 and the pair of blade portions 12 have the hardening regions Q and the non-hardening regions respectively. In addition, in the intermediate top portion 11, the ratio between the hardening regions Q and the non-hardening region in the front-and-rear direction of the vehicle is changed in the longitudinal direction of the center pillar 10 in such a manner that the proportion of the hardening regions Q increases as shifting from the upper portion to the lower portion. Also, in each of the pair of blade portions 12, the area ratio between the hardening region Q and the non-hardening region in the width direction of the blade portion 12 is changed in the longitudinal direction of the center pillar 10 in such a manner that the proportion of the hardening region Q increases as shifting from the upper portion to the lower portion.

The above-described hardening regions Q are formed by manufacturing the center pillar 10 from the aforesaid galvanized steel sheet by the transfer press work, forming the holes 18 in the manufacturing, and thereafter performing hardening treatment on the center pillar 10 by an induction hardening apparatus.

FIG. 8 shows a general configuration of an induction hardening apparatus 30. The induction hardening apparatus 30 has an oscillator 31; and a pair of coil portions 32 provided in the front-and-rear direction of the vehicle which are connected to the oscillator 31 and set on the center pillar 10 or set to oppose the center pillar 10. Therefore, the induction hardening apparatus 30 can provide the above-described hardening regions Q in the center pillar 10 depending on the setting such as the shape of the coil portions 32 provided for each of the hardening regions Q which are formed separately in the front-and-rear direction of the vehicle in the center pillar 10.

The hardening treatment by the induction hardening apparatus 30 provides the hardening regions Q, which are hardened, shown in FIG. 4 to FIG. 7 in the center pillar 10.

According to the above-described embodiment, the hardening regions Q and the non-hardening regions are provided in the intermediate top portion 11 and the pair of blade portions 12 of the center pillar 10, in which the strength of the center pillar 10 is decided by the ratio between the hardening regions Q and the non-hardening region in the front-and-rear direction of the vehicle in the intermediate top portion 11, and by the area ratio between the hardening region Q and the non-hardening region in the width direction of the blade portion 12 in the blade portions 12. Therefore, a demanded strength of the center pillar 10 can be set by these ratios, and the strength distribution in the longitudinal direction of the center pillar 10 can be easily set by deciding the ratio between the hardening regions Q and the non-hardening regions in the longitudinal direction of the center pillar 10.

Besides, the hardening regions Q in the center pillar 10 are provided at a portion corresponding to the window hole for inserting therein the window 20 provided in the side door. Although this portion of the center pillar 10 is a portion formed in such a manner that the width thereof in the front-and-rear direction of the vehicle is small to ensure a wide vision from the cabin, the provision of the hardening regions Q in this portion can impart to this portion a sufficient strength against a load upon a side collision with other vehicles, walls and so on.

Further, a portion lower than the hardening regions Q is reinforced with a reinforcing beam which is installed in a portion of the side door lower than the window glass 20, and this reinforcing beam ensures a strength against the collision load for the portion lower than the hardening regions Q. In addition, the hardening regions Q are in the form, widening toward the end, which expands from the upper portion to the lower portion of the center pillar 10 and, accordingly, can provide a high strength of a point receiving a large side collision load from other vehicles and so on. In addition, collision energy can be effectively absorbed by a portion which is higher than the point and whose strength gradually decreases and whose tenacity gradually increases in accordance with the expansion of the non-hardening regions.

Besides, the hardening regions Q are changed continuously and not changed sharply, and therefore, no point is produced which changes sharply in strength by the hardening treatment, thus preventing the center pillar 10 from being folded upon reception of a collision load or the like from other vehicles and so on.

Further, the center pillar 10 is provided with the reinforcements 16 and 17 at the upper and lower portions of the hardening regions Q, so that the reinforcement 16 at the upper portions of the hardening regions Q can ensure a great strength of joining with the roof portions of the aforesaid outer panel 2 and the inner panel 3 which constitute the vehicle body, and the lower reinforcement 17 at the lower portions of the hardening regions Q can increase the strength of points to which side door hinges are attached. Furthermore, these reinforcements 16 and 17 can eliminate a sharp drop in the strength of the center pillar 10 at the upper and lower end portions of the hardening regions Q.

Moreover, the regions in the intermediate top portion 11 of the hardening regions Q provided in the center pillar 10 are provided separately on both sides in the front-and-rear direction of the vehicle in the intermediate top portion 11. An intermediate portion between both sides, that is, a portion which is the non-hardening region, is formed with the holes 18 which become necessary at the time of electrodeposition coating as described above. Since the hardening regions Q are provided on both sides in the front-and-rear direction of the vehicle in the intermediate top portion 11 and away from the positions of the holes 18, the provision of the hardening regions Q in the center pillar 10 by the induction hardening operation after the formation of the holes 18 never causes unevenness in hardening due to the induction hardening energy concentrating to the surroundings of the holes 18.

Besides, the center pillar 10 is manufactured by conducting press work on a steel sheet which is 441.29925 N/mm$^2$ in tensile strength, and this tensile strength is not so high, so that a center pillar 10 in a complex shape can be formed in a shape as desired. In addition, the hardening temperature for hardening the steel sheet with the above tensile strength only needs to be a relatively low temperature, 900° C. or lower, for example, a temperature within a range from 750° C. to 900° C. In particular, a hardening temperature within a range from 800° C. to 850° C. never breaks a galvanized layer of the galvanized steel sheet as well as can ensure a predetermined strength by the hardening. This makes it possible to achieve a strength required as the center pillar 10 using as the material of the center pillar 10 the galvanized steel sheet which is effective against rust.

FIG. 9 shows an embodiment in which a reinforcement 40, which has the same or almost the same length as that of the range in the longitudinal direction of the center pillar 10 provided with the hardening regions Q, is joined to the center pillar 10 by spot welding. According to this embodiment, the whole weight of the center pillar 10 increases by that of the reinforcement 40. However, this embodiment provides an advantage that the whole strength of the center pillar 10 can be increased by the increment of strength resulting from the provision of the hardening regions Q in the center pillar 10, as compared to the case of another center pillar having the same whole weight.

It should be noted that, in this embodiment, the reinforcement 40 may be provided on the center pillar 10 as a member independent of the reinforcements 16 and 17 shown in FIG. 3 and FIG. 4, or may be provided on the center pillar 10 as a member having a long vertical dimension and serving also as the reinforcements 16 and 17. Alternatively, the reinforcements 16 and 17 may be superposed on and joined to the reinforcement 40 having the long vertical dimension.

Figure 16:
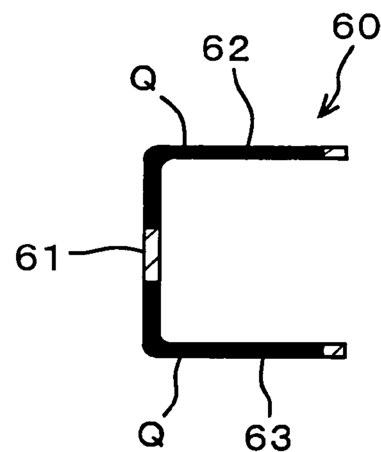
FIG. 16 is a cross-sectional view taken along a line S16—S16 in FIG. 12.
Figure 17:
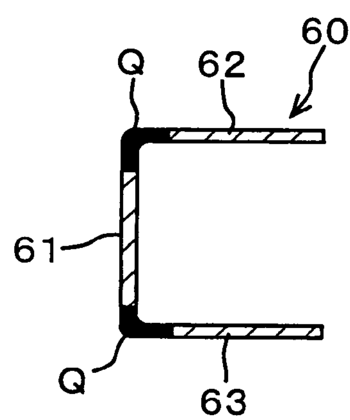
FIG. 17 is a cross-sectional view taken along a line S17—S17 in FIG. 12.
Figure 18:
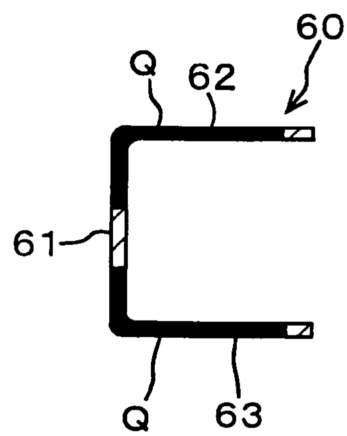
FIG. 18 is a cross-sectional view taken along a line S18—S18 in FIG. 12.

FIG. 10 to FIG. 18 show an embodiment of a front bumper beam and front side frames of a four-wheel vehicle when the hardening treatment is applied thereto. FIG. 10 is a perspective view of a front bumper beam 50 and a right and left pair of front side frames 60 before combination, FIG. 11 is a plan view after the combination, and FIG. 12 is a side view after the combination. FIG. 13 is a cross-sectional view taken along a line S13—S13 in FIG. 11, FIG. 14 is a cross-sectional view taken along a line S14—S14 in FIG. 11, FIG. 15 is a cross-sectional view taken along a line S15—S15 in FIG. 11, FIG. 16 is a cross-sectional view taken along a line S16—S16 in FIG. 12, FIG. 17 is a cross-sectional view taken along a line S17—S17 in FIG. 12, and FIG. 18 is a cross-sectional view taken along a line S18—S18 in FIG. 12.

As shown in FIG. 10 to FIG. 12, on both right and left sides of the front bumper beam 50 having a whole shape in the form of a bow in which the middle portion in the longitudinal direction thereof bulges forward, tip portions of the right and left pair of front side frames 60 are combined to the front bumper beam 50 by welding or with fastening means such as bolts or the like. These front side frames 60 are combined to right and left side bodies and a dashboard panel in an engine room of an FF four-wheel vehicle.

As shown in FIG. 10 and FIG. 13 to FIG. 15, the front bumper beam 50 is composed of: a front face portion 51 which is an intermediate top portion extending in the longitudinal direction being the lateral direction of the vehicle; and an upper face portion 52 and a lower face portion 53 being a pair of blade portions which are both bent toward the backside of the vehicle in a direction perpendicular to the longitudinal direction within the surface of the front face portion 51, in other words, on both upper and lower sides, with a direction of the bend being a direction of the width thereof; and a rear face portion 54 which combines rear end portions of the upper face portion 52 and the lower face portion 53. The upper face portion 52, the lower face portion 53, and the rear face portion 54 are designed to extend, similarly to the front face portion 51, in the longitudinal direction of the front bumper beam 50 and have a length across the whole length of the front bumper beam 50.

Hardening regions Q provided in the front bumper beam 50, as shown in FIG. 11 showing the outlines of the hardening regions Q on the upper face portion 52 by two-doted chain lines 55 and in FIG. 13 to FIG. 15 showing changes in the regions Q in the longitudinal direction of the front bumper beam 50, are increased at combined portions on both right and left sides to which tip portions of the right and left pair of front side frames 60 are combined and gradually decrease toward the middle portion between the right and left sides.

Such a design of the hardening regions Q makes it possible that when a light collision load acts on the middle portion of the front bumper beam 50 having a whole shape in the form of a bow in which the middle portion between the right and left sides bulges forward, the light collision load can be effectively received by the middle portion which is not so high in strength and is high in tenacity instead because of the non-hardening region. On the other hand, a large collision load can be effectively received by the right and left combined portions which have high strengths resulting from the hardening regions Q being larger in area than the non-hardening region and to which the front side frames 60 are combined.

As shown in FIG. 10 and FIG. 16 to FIG. 18, each of the front side frames 60 includes: a web portion 61 which is an intermediate top portion extending in the longitudinal and front-and-rear direction of the vehicle; and flange portions 62 and 63 being an upper and lower pair of blade portions which are both bent toward the outside of the vehicle in a direction perpendicular to the longitudinal direction within the surface of the web portion 61, in other words, on both upper and lower sides, with the direction of the bend being the direction of the width thereof. The flange portions 62 and 63 extend, similarly to the web portion 61, in the longitudinal direction of the front side frame 60.

Hardening regions Q provided in the front side frame 60 having such a shape, as shown in FIG. 12 showing the outlines of the hardening regions Q in the web portion 61 by two-doted chain lines 64 and in FIG. 16 to FIG. 18 showing changes in the regions Q in the longitudinal direction of the front side frame 60, are large at a tip portion combined to the front bumper beam 50 and at a rear portion at a position retreating from the tip portion toward the backside of the vehicle with an interval therefrom, and are small at a middle portion between these portions.

Such a design makes it possible that when a large collision load acts on the front side frame 60 from the front bumper beam 50, the middle portion having a low strength between the tip portion and the rear portion can be a buckling point where buckling is caused, so that a large collision energy can be effectively absorbed by the front side frame 60 due to the buckling point.

Next, a method and an apparatus for performing induction hardening on press formed articles, including vehicle body parts such as a center pillar and so on, are described.

A press formed article 101 shown in FIGS. 19A and 19B is produced by press forming a steel sheet and has a shape provided with: an intermediate top portion 101A extending across the whole length thereof; flange portions 101B on both sides thereof; blade portions 101D which are provided between the intermediate top portion 101A and the flange portions 101B and are both bent toward the same side in a direction perpendicular to the longitudinal direction of the intermediate top portion 101A within the surface of the intermediate top portion 101A, and extend in the longitudinal direction of the intermediate top portion 101A, with a direction of the bend being a direction of the width thereof, in which, between the intermediate top portion 101A and the two blade portions 101D, ridge portions 101C are formed. Regions having a small width set along the ridge portions 101C (portions shown by hatchings) are hardening regions 102 to be subjected to hardening.

The hardening regions 102 extend over the intermediate top portion 101A and the blade portions 101D, and a portion between the two hardening regions 102 in the intermediate top portion 101A is a non-hardening region.

In the drawing, the hardening regions 102 have a fixed width along the ridge portions 101C. However, when the ratio between the hardening regions 102 and the non-hardening region is changed along the ridge portions 101C, in other words, along the longitudinal direction of the intermediate top portion 101A, the width dimension of the hardening regions 102 in the direction perpendicular to the longitudinal direction of the intermediate top portion 101A is changed in the longitudinal direction of the intermediate top portion 101A.

For application of hardening treatment to the press formed article 101, first, the flange portions 101B of the press formed article 101 are mounted on a supporting face 105A of a support 105 and fixed with fixing members 106 and bolts or clamps (not shown). The supporting face 105A of the support 105 in use here has bends matching bends of the flange portions 101B of the press formed article 101, thereby allowing the press formed article 101 to be fixed and held as it is in a predetermined shape. Note that if not negligible distortion occurs in the press formed article 101 in the hardening of the press formed article 101, it is recommendable to design the shape of the supporting face 105A of the support 105 to be able to add to the press formed article a reverse distortion capable of canceling the distortion caused by the hardening when the press formed article 101 is fixed on the supporting face 105A, or to give a reverse distortion in advance to the press formed article 101 by appropriately disposing a spacer between the press formed article 101 and the supporting face 105A when mounting the press formed article 101 thereon. Such a reverse distortion is given in advance to cancel the distortion caused by the hardening, whereby a hardened press formed article in a desired shape with little or no distortion can be obtained.

Note that the hardening treatment may be performed without clamping or with loosely clamping the press formed article to allow the press formed article to freely become deformed during heating for the hardening.

Then, as shown in FIG. 21 and FIG. 22, heating inductors 111 for induction hardening are disposed closely to cover most of the hardening regions 102 which are set in the ridge portions 101C of the intermediate top portion 101A of the press formed article 101, and cooling pipes 113 capable of spraying cooling water at once to the whole of the regions heated by the heating inductors 111 are disposed inside the press formed article 101. The heating inductors 111 in use here include inductive conductors 112 which are formed of hollow cylindrical conductors such as copper pipes or the like, and formed in a shape capable of being along the ridge portions 101C on both sides of the intermediate top portion 101A, respectively through an almost fixed distance. The shape of the cross section of the inductive conductor 112 is described below. The heating inductors 111 disposed on both sides have ends coupled to each other in such a configuration capable of application of current thereto and flowing water therethrough, by means of a coupling member 114 which is composed of a hollow conductor, and the other ends provided with connecting pipes 115 which are composed of hollow conductors. The connecting pipes 115 are connected to a power supply device (not shown) which applies a high frequency current to the heating inductors 111 and coupled to supply and drainage pipes of the cooling water. Thus, the heating inductors 111 have a configuration to be supplied with a high frequency current by the power supply device as well as with cooling water flowing in the hollow inside thereof so that the heating inductors 111 themselves are cooled.

Next, the shape of the cross section of the heating inductor 111 (the shape of the cross section in a face across the intermediate top portion 101A with the heating inductor 111 disposed opposing the hardening region 102) is described. As shown in FIG. 23, the inductive conductor 112 of the heating inductor 111 includes an inductive face 112A opposing the hardening region 102 set in the press formed article 101. The shape in the direction across the intermediate top portion 101A of the inductive face 112A is made a shape following a face shape of the hardening region 102. This configuration allows an opposing distance D of the inductive conductor 112A with respect to the hardening region 102 to be even in the direction across the intermediate top portion 101A. The opposing distance D is made even as described above, so that heat can be inputted, by the application of a high frequency current to the heating inductor 111, to the region opposing the inductive face 112A of the press formed article 101 almost evenly across the entire width thereof. It is preferable to set the distance D here normally to about 1 mm to about 4 mm to enhance the heat input efficiency. A width W1 of the inductive face 112A of the heating inductor 111 is set to be almost the same as a width W2 of the hardening region 102. It is preferable to previously form an insulating coating 117 such as an alumina sprayed coating at least on the inductive face 112A opposing the hardening region of the inductive conductor 112. The formation of the insulating coating 117 makes it possible to prevent short circuiting even though the heating inductor 111 touches the press formed article 101 when the heating inductor 111 is disposed closely to the press formed article 101.

As understood from the above explanation, the inductive conductor 112 having the inductive face 112A opposing the hardening region 102 corresponds in size to the hardening region 102, and therefore, the inductive conductor 112 has a size capable of heating the whole of the hardening region 102 at once.

When the heating inductor 111 is disposed closely to the press formed article 101, the distance D between the inductive face 112A of the heating inductor 111 and the hardening region 102 of the ridge portion 101C is normally made fixed in the width direction of the heating inductor 111 (the direction across the intermediate top portion 101A) as shown in FIG. 23, and is also made fixed in the longitudinal direction (the longitudinal direction of the intermediate top portion 101A) as shown in FIG. 24. The distance D, however, may have a configuration appropriately changed for adjusting the maximum arrival temperature or the like. As a method of holding the heating inductor 111 so that the inductive face 112A thereof has a predetermined distance D with respect to the hardening region 102 of the ridge portion 10C, a method can be proposed in which the heating inductor 111 is held by a suitable holding member (not shown), and the holding member is positioned at a desired position with respect to the support 105. Alternatively, it is also adoptable to employ a method of disposing an appropriate insulating spacer between the heating inductor 111 and the hardening region 102 of the ridge portion 101C, and pushing the heating inductor 111 to the hardening region 102 through the spacer. In the case of using the spacer, the spacer is preferably attached to the face 112A opposing the hardening region 102 of the heating inductor 111 for facilitation of the operation of arranging the heating inductor 111. This spacer is advantageous particularly when controlling the distance of the heating inductor 111 with respect to the press formed article 101 which is mounted with a reverse distortion given.

As described above, after the heating inductors 111 are disposed closely to the press formed article 101, the power supply device (not shown) applies a high frequency current to the heating inductors 111 to inductively heat the whole of the hardening regions 102 at the two points of the press formed article 101 at once, thereby raising the hardening regions 102 in temperature to be able to harden them. Subsequently, the application of the current is stopped, and the cooling water is sprayed from the cooling pipes 113 to the hardening regions 102 to cool them rapidly. Thereby, the whole of the hardening regions 102 at the two points are hardened at once. Here, as shown in FIG. 23, the inductive face 112A opposing the hardening region 102 of the press formed article 101 of the heating inductor 111 is made to be in a shape following the face shape of the hardening region 102 in the direction across the intermediate top portion 101A and the distance D therebetween is made even, so that when a high frequency current is applied to the heating inductor 111, the whole of the hardening region 102 opposing the inductive face 112A is allowed to generate heat almost evenly, and accordingly, the whole of the hardening region 102 can be raised in temperature to almost the same maximum arrival temperature in a short time. The induction heating by the heating inductor 111 is performed in a time as short as possible to reduce, as much as possible, heat at a heat generating portion spreading to a region adjacent thereto by heat conduction. If the hardening region 102 is slowly raised in temperature by the heating inductor 111 by decreasing the speed of temperature rise, the heat at the heat generating region spreads to the surroundings by heat conduction to cause the outside of the hardening region 102 to be also raised in temperature to such a temperature at which it is hardened. As a result, the hardened region spreads out to the outside of the hardening region 102 which is to be hardened intentionally, and in addition, the spread might be nonuniform or the hardened region might be nonuniform between products. Hence, the temperature raising time is decreased to thereby suppress as much as possible the heat conduction to the surroundings, thereby making it possible to apply hardening only to the hardening region 102 which substantially corresponds to the region opposing the inductive face 112A of the heating inductor 111. As a result of checking by the present inventors, an excellent result could be provided by setting the induction heating time to 10 seconds or shorter, more desirably, 5 seconds or shorter.

The frequency of the high frequency current application to the heating inductor 111 is preferably set in a range from 1 kHz to 50 kHz which are widely used for normal induction heating, and more preferably, a frequency within a relatively low frequency range from 5 kHz to 25 kHz is used. Within the low frequency range, the distance D between the inductive face 112A of the heating inductor 111 and the hardening region 102 exerts a small effect on the heat input amount. Therefore, a frequency within the range enables uniform heating even with a little unevenness in the distance D, thus providing an advantage of facilitating arrangement of the heating inductor 111.

In the above-described embodiment, the opposing distance D of the inductive face 112A of the heating inductor 111 with respect to the hardening region 102 is made fixed in both the width direction and the longitudinal direction of the heating inductor 111 to raise the hardening region 102 in temperature to an almost uniform temperature. However, since the heat spreads to the adjacent region by heat conduction in the induction heating of the hardening region 102, the temperature tends to lower at the peripheral region of the hardening region 102, and particularly at both end regions in the longitudinal direction. Therefore, if the distance of the inductive face 112A with respect to the hardening region 102 is fixed, the uniformity in temperature can not be ensured in some cases. In such a case, it is recommendable to vary the distance of the inductive face 112A with respect to the hardening region 102 depending on places to make the temperature uniform. For example, the distance of the heating inductor 111 with respect to the hardening region 102 can be set smaller at both end portions in the longitudinal direction of the intermediate top portion 101A than at the middle portion to increase the heat input amount at both end portions for uniformity of the temperature.

In the above-described embodiment, the hardening region 102 is raised in temperature to a uniform temperature to uniformly harden the whole thereof, thereby achieving a uniform hardening hardness. When the hardening hardness of the hardening region 102 is desired to change along the intermediate top portion 101A, the distance between the inductive face 112A of the heating inductor and the hardening region 102 can be changed along the intermediate top portion 101A to change the maximum arrival temperature along the intermediate top portion 101A, or a cooling condition (for example, the amount of cooling water) can be changed along the intermediate top portion 101A, so as to achieve a desired hardness distribution.

For example, in FIG. 25A, when it is desired to make the hardening region 102 lower in hardening hardness at both end portions 102A than at a middle portion 102B to make smaller the difference in hardness of the hardening region 102 with respect to regions with no hardening applied thereto, it is only required to set, as shown in FIG. 25B, distances D' between the inductive face 112A of the heating inductor 111 and the hardening region 102 at both end portions 102A wider than the distance D at the middle portion 102B, or by setting the amount of cooling water smaller at both end portions 102A than at the middle portion 102B, thereby making the hardening hardness lower at both end portions 102A than at the middle portion 102B.

EXAMPLE 1

Figure 19:
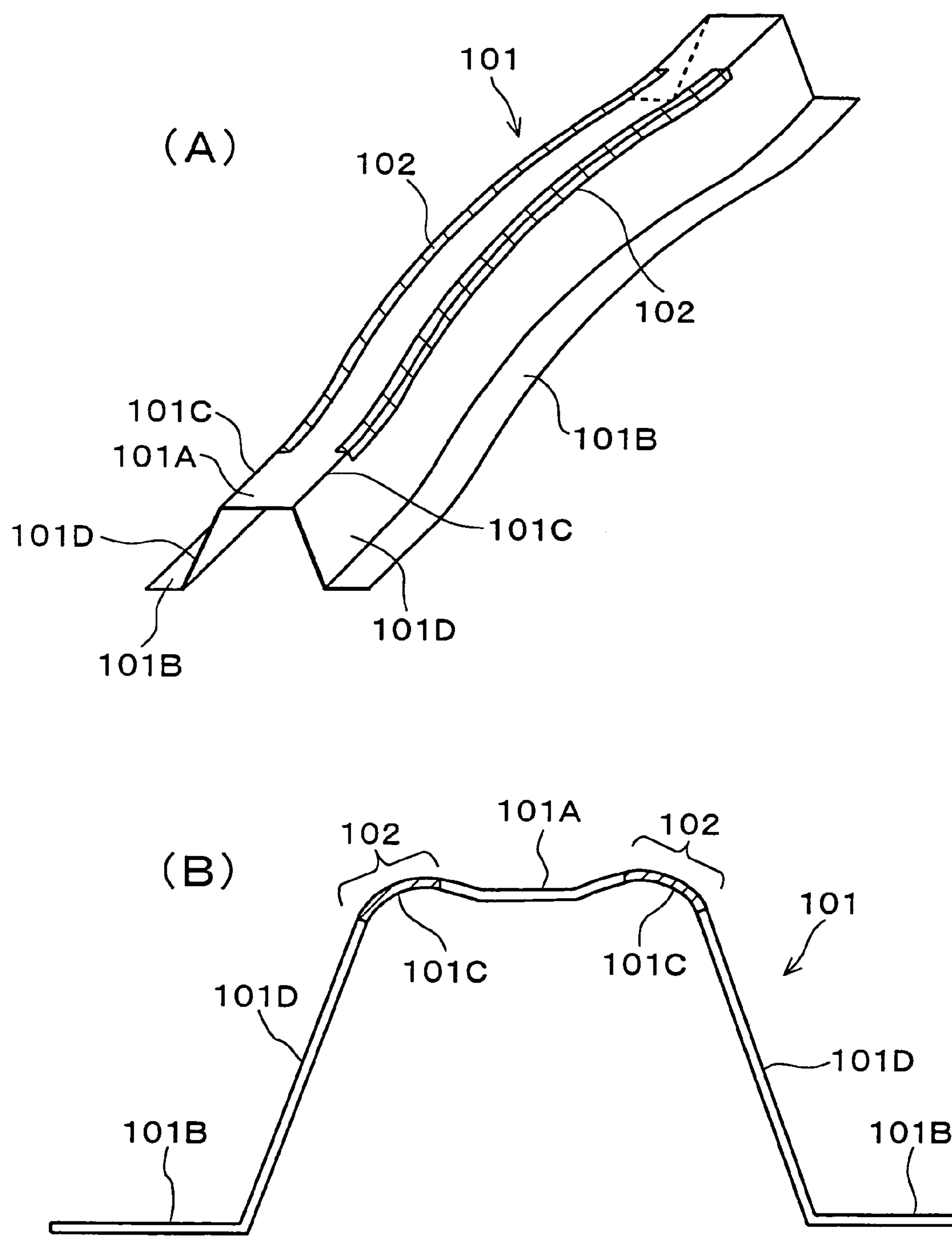
FIG. 19A is a schematic perspective view showing a press formed article to be subjected to induction hardening, and 19B is a schematic cross-sectional view of the press formed article.

The heating inductors 111 having a cross section in the form shown in FIG. 23 and a width W1=12 mm were disposed, with an opposing distance D=3 mm, above the hardening regions 102 set in the ridge portions of the press formed article 101 made of a steel sheet 1.4 mm in thickness in the form shown in FIG. 19 and FIG. 23. A high frequency current was applied to the heating inductors 111 at a frequency of 8 kHz for 5 seconds to raise them in temperature to a range from 850° C. to 950° C., and immediately thereafter the cooling water was sprayed thereto to thereby perform hardening. After the completion of the hardening, the hardening hardness distribution of the hardening regions 102 in the width direction thereof, was measured. An example thereof is shown in FIG. 26. Note that FIG. 26 shows data of a half portion in the width direction of the hardening region of one of the ridge portions, in which the horizontal axis indicates the position in the width direction of the hardening region 102 with the middle in the width direction of the hardening region as a reference point (ordinate 0), and the vertical axis indicates the hardness.

EXAMPLE 2

The heating inductors 111 which are the same as those in Example 1 were disposed, with an opposing distance D=3 mm, above the hardening regions 102 set in the ridge portions of the press formed article 101 the same as that in Example 1. A high frequency current was applied to the heating inductors 111 at a frequency of 8 kHz for 8 seconds to raise them in temperature to a range from 850° C. to 950° C., and immediately thereafter the cooling water was sprayed thereto to thereby perform hardening. After the completion of the hardening, the hardening hardness distribution in the width direction, was measured for results shown in FIG. 26.

As is clear from the graph shown in FIG. 26, in both Examples 1 and 2, the regions opposing the heating inductors 111 of the ridge portions 101C could be hardened at an almost fixed hardness. However, while a region having a substantially high hardness was produced outside the region having the fixed hardness in Example 2, the hardness was steeply lowered in Example 1. From the fact, it was confirmed that the reduced heating time allows hardening to be performed only on the regions opposing the heating inductors 111.

The hardening treatments of the above-described Examples 1 and 2 were tried by application of a high frequency current at 25 kHz, and results not so different from the above examples were obtained.

FIG. 27 to FIG. 29 show a hardening apparatus according to a more specific embodiment, and this hardening apparatus is designed to be able to perform hardening on the hardening regions 102 of the press formed article 101 in an anti-oxidation gas atmosphere. FIG. 27 is a side cross-sectional view of the hardening apparatus shown including a circulation path of the cooling water and a supply path of the anti-oxidation gas, FIG. 28 is an enlarged view of an essential portion in FIG. 27, and FIG. 29 is a cross-sectional view taken along a line S29—S29 in FIG. 28. In the description hereinafter, components having the same functions or operations as those of members and devices which have been already described, are assigned the same reference numerals.

In FIG. 27, a pan 121 is set on a base 120, and the support 105 is disposed inside the pan 121, in which the press formed article 101 is set on the supporting face 105A being the upper face of the support 105. The press formed article 101 is fixed to the supporting face 105A by a clamping force of a not shown booster mechanism type clamping device such as a toggle mechanism or the like which acts on the fixing member 106. By releasing clamping of the clamping device which is an automatic device or a manual operation device, the press formed article 101 can be removed from the supporting face 105A.

Above the press formed article 101, a cover 122 is provided which is shown also in FIG. 28 and FIG. 29, and the cover 122 covering the outside of the press formed article 101 is attached to a high frequency power supply device 125 through stays 123 and a bracket 124. The high frequency power supply device 125 is, as shown in FIG. 27, hung from an arm 127 of a column 126 stood from the base 120 through guide rails 128. By operating a handle 129, the high frequency power supply device 125 and the cover 122 are moved in the lateral direction in FIG. 29 guided by the guide rails 128 so as to be adjusted in position. Further, the arm 127 in FIG. 27 is disposed on a guide portion 126A of the column 126 in such a manner to be freely vertically slidable by expansion and contraction of a cylinder 130.

The cover 122 covering the upper side of the press formed article 101, as shown in FIG. 28, extends in the longitudinal direction of the elongated intermediate top portion 101A of the press formed article 101. As shown in FIG. 29, the heating inductors 111, to which a high frequency current is applied from the high frequency power supply device 125, are disposed at points opposing the two hardening regions 102 of the press formed article 101 on a lower face of the cover 122. These heating inductors 111 are coupled to each other through the coupling member 114 which has been explained in FIG. 21, and the respective inductive conductors 112 of the heating inductors 111 vertically oppose the hardening regions 102. The heating inductors 111 made of a low electrical resistance material such as copper or the like are attached to the cover 122 with stud bolts 132 piercing retaining bars 131 made of a nonconductive material such as bakelite or the like and the cover 122 made of fire resistive and nonconductive calcium silicate fiber or the like. Further, insulating members are inserted between the stays 123 made of a metallic material such as stainless steel or the like and the stud bolts 132.

The dimension in the direction perpendicular to the longitudinal direction of the press formed article 101 of the inductive conductors 112 shown in FIG. 29 is varied in the longitudinal direction of the press formed article 101. Therefore, the ratio between the hardening regions 102 and the non-hardening regions in the direction perpendicular to the longitudinal direction is varied in the longitudinal direction in the press formed article 101 after hardening.

By adjusting the cover 122 position in the lateral direction in FIG. 29 by the operation of the handle 129 shown in FIG. 27, the respective positions of the heating inductors 111 are adjusted to the positions exactly opposing the hardening regions 102. In this position-adjusted state, the cylinder 130 shown in FIG. 27 is contracted to lower the cover 122, thereby providing the distance of the above-described predetermined size between the inductive faces 112A shown in FIG. 29 of the inductive conductors 112 and the hardening regions 102. Conversely, the cylinder 130 is expanded to raise the cover 122, thereby releasing the aforesaid clamping of the clamping device, so that the next press formed article, in turn, can be set on the supporting face 105A of the support 105 by a loading device such as a robot or the like.

It should be noted that although the inductive conductors 112 shown in FIG. 29 are not provided with the insulating coating 17 shown in FIG. 23, the inductive conductors 112 in FIG. 29 may also be, of course, provided with the insulating coatings. Further, it is also possible to attach to the inductive faces 112A spacers which securely hold distances of a predetermined size between the inductive faces 112A of the inductive conductors 112 and the hardening regions 102 when the cover 122 is lowered by the contraction of the cylinder 130.

As shown in FIG. 29, the cover 122 has a cross section, in the direction across the intermediate top portion 101A of the press formed article 101, in a cone shape such that the middle portion thereof between the two heating inductors 111 is greatly apart upward from the press formed article 101. At the middle portion of the lower face of the cover 122, a first anti-oxidation gas supply pipe 140, which is a first anti-oxidation gas supply means, is disposed along the longitudinal direction of the cover 122. The anti-oxidation gas supply pipe 140 is held by a hold member 141 which is attached with stud bolts 143 to a bracket 142 installed between the stays 123 which are provided on the right and left sides in FIG. 29.

The first anti-oxidation gas supply pipe 140 and the hold member 141 are formed of a nonconductive material such as a synthetic resin or the like, thereby preventing an induction current from being generated in the anti-oxidation gas supply pipe 140 and the hold member 141 even if they extend in a direction parallel to the heating inductors 111. Furthermore, as described above, the anti-oxidation gas supply pipe 140 and the hold member 141 are disposed at the middle portion of the cover 122 which is greatly apart from the two heating inductors 111. Therefore, even when a high frequency current is applied to the inductive conductors 112 of the heating inductors 111, and the hardening regions 102 are heated by an induction current generated in the hardening regions 102 of the press formed article 101 due to the application of current, the anti-oxidation gas supply pipe 140 and the hold member 141 are prevented from being excessively heated to a fixed temperature or higher by radiation heat from the inductive conductors 112 and the hardening regions 102.

As shown in FIG. 29, there is a distance space S1 between the press formed article 101 and the cover 122. After the anti-oxidation gas, such as nitrogen gas or the like, jetting from the first anti-oxidation gas supply pipe 140 is supplied to the distance space S1 to bring the distance space S1 to a space of the anti-oxidation gas atmosphere, hardening is performed on the hardening regions 102 by application of a high frequency current to the inductive conductors 112 of the heating inductors 111. Further, as is understood from FIG. 28, both end portions in a longitudinal direction along the intermediate top portion 101A of the press formed article 101 of the distance space S1, are open to be open ends 144. At both end portions in the longitudinal direction of the cover 122 close to the open ends 144, first anti-oxidation gas jet pipes 145, which are first anti-oxidation gas jet means, are disposed along the cover 122. As shown in FIG. 29, the anti-oxidation gas jetting from the anti-oxidation gas jet pipes 145 forms gas curtains at the open ends 144, thereby preventing the anti-oxidation gas supplied into the distance space S1 from flowing out from the open ends 144.

As shown in FIG. 29, the press formed article 101 is set on the support 105 with the intermediate top portion 101A upward so that an inside space S2 is provided inside the intermediate top portion 101A. In this inside space S2, the cooling pipes 113 are disposed which spray the cooling water to the hardening regions 102. Further, in the inside space S2, a second anti-oxidation gas supply pipe 150 is also disposed which is a second anti-oxidation gas supply means for supplying anti-oxidation gas into the space S2. After the anti-oxidation gas is jetted from this anti-oxidation gas supply pipe 150 to bring the inside space S2 to an anti-oxidation gas atmosphere, hardening is performed on the hardening regions 102.

As is understood from FIG. 28, both end portions in a longitudinal direction along the intermediate top portion 101A of the press formed article 101 of the inside space S2, are open to be open ends 151. At positions of the support 105 close to the open ends 151, second anti-oxidation gas jet pipes 152 being second anti-oxidation gas jet means are disposed through in the direction across the intermediate top portion 101A of the press formed article 101. As shown in FIG. 29, these anti-oxidation gas jet pipes 152 are provided with a plurality of nozzles 152A which are inserted into the supporting face 105A of the support 105. The anti-oxidation gas is jetted from the nozzles 152A to form gas curtains at the respective open ends 151, thereby preventing the anti-oxidation gas supplied into the inside space S2 from flowing out from the open ends 151.

As shown in FIG. 27, the first anti-oxidation gas supply pipe 140, the first anti-oxidation gas jet pipes 145, the second anti-oxidation gas supply pipe 150, and the second anti-oxidation gas jet pipes 152 are connected to an anti-oxidation gas supply path 154 extending from an anti-oxidation gas cylinder 153, and are supplied with the anti-oxidation gas from the anti-oxidation gas cylinder 153 respectively.

Further, the cooling pipes 113 are connected to a storage tank 160 storing the cooling water therein, through an outward path 161 which supplies the cooling water in the storage tank 160 to the cooling pipes 113. The cooling water sprayed from the cooling pipes 113 to the hardening regions 102 flows out from the open ends 151 of the inside space S2 into the aforesaid pan 121 in which the press formed article 101 is disposed. The pan 121 is formed with drain holes 121A at the bottom, and the drain holes 121A are connected to the storage tank 160 through a homeward path 162.

This forms a circulation path 163 for circulating therein the cooling water between the storage tank 160 and the pan 121. The pan 121 is a member forming a part of the circulation path 163, so that the cooling water, which is supplied to the hardening regions 102 of the press formed article 101, is reused by circulation use.

To an appropriate position of the circulation path 163, more specifically, to the storage tank 160, a replenishing pipe 164 for the cooling water is connected which replenishes the storage tank 160 with the cooling water which is evaporated and lost due to spray to the hardening regions 102.

Furthermore, into the storage tank 160, a blow pipe 165 is inserted for blowing the anti-oxidation gas into the cooling water stored in the storage tank 160. The anti-oxidation gas is blown from the blow pipe 165 into the cooling water in the storage tank 160 to remove dissolved oxygen dissolved in the cooling water. Thus, the blow pipe 165 forms a dissolved oxygen removing means 166 for removing the dissolved oxygen from the cooling water circulating in the circulation path 163. Since the cooling water, which is sprayed from the cooling pipes 113 to the hardening regions 102, has dissolved oxygen removed and since the hardening regions 102 are hardened in the anti-oxidation gas atmospheres formed of the anti-oxidation gas supplied into the distance space S1 and the inside space S2, hardening can be performed on the press formed article 101 while preventing oxidation of the hardening regions 102.

Since the cooling water returning from the pan 121 to the storage tank 160 has been raised in temperature due to the spray to the hardening regions 102, the storage tank 160 is provided with a heat removing means 170 for removing heat from the cooling water. The heat removing means 170 has a water tank 172 storing therein water circulated to and from a cooling tower 171, and a heat exchanger 173 which is installed between the water tank 172 and the storage tank 160. The water cooled in the cooling tower 171 removes heat from the cooling water in the storage tank 160 through the heat exchanger 173.

Note that the cooling tower may be provided along the circulation path 163 of the cooling water to remove heat directly from the cooling water.

As shown in FIG. 28, the second anti-oxidation gas supply pipe 150 and the second anti-oxidation gas jet pipes 152 are connected to a pipe 181 linking with the aforesaid anti-oxidation gas supply path 154, through joint members 180. The cooling pipes 113 are also connected to a pipe 183 linking with the outward path 161 of the aforesaid circulation path 163 for the cooling water, through a joint member 182.

This makes it possible to use in common the pipe 181 of the anti-oxidation gas supply path 154 and the pipe 183 of the circulation path 163 even when the support 105, which is prepared for each of the press formed articles which is different in shape, length, and so on, is replaced with another to perform hardening on a press formed article which is different in shape, length, and so on by removing the joint members 180 and 182.

The hardening operation on the press formed article 101 by the hardening apparatus having the above-described configuration is performed as follows:

First, the loading device such as a robot or the like sets the press formed article 101 on the supporting face 105A of the support 105, and the press formed article 101 is clamped on the supporting face 105A with the clamping device which acts on the fixing members 106. Subsequently, the anti-oxidation gas is supplied from the second anti-oxidation gas supply pipe 150 into the inside space S2, and the gas curtains are formed of the anti-oxidation gas from the second anti-oxidation gas jet pipes 152, at the open ends 151 of the inside space S2. This brings the inside space S2 to the anti-oxidation gas atmosphere. It should be noted that the supply amount of the anti-oxidation gas from the second anti-oxidation gas supply pipe 150 to the inside space S2 is set large at the beginning and then gradually decreased to a fixed amount, thereby expelling air in the inside space S2 in a short time, resulting in improved operation efficiency. In addition, the formation of the gas curtains at the open ends 151 prevent the anti-oxidation gas from flowing out from the inside space S2 to thereby keep the anti-oxidation gas atmosphere in the space S2.

Thereafter, the cover 122 is lowered by the cylinder 130 shown in FIG. 27 to be in a state to the press formed article 101 as shown in FIG. 29. Subsequently, the anti-oxidation gas is supplied from the first anti-oxidation gas supply pipe 140 into the distance space S1, and the gas curtains are formed of the anti-oxidation gas from the first anti-oxidation gas jet pipes 145, at the open ends 144 of the distance space S1. This brings the distance space S1 to the anti-oxidation gas atmosphere. Also in this case, the supply amount of the anti-oxidation gas from the first anti-oxidation gas supply pipe 140 to the distance space S1 is set large at the beginning and then gradually decreased to a fixed amount, thereby expelling air in the distance space S1 in a short time, resulting in improved operation efficiency. In addition, the formation of the gas curtains at the open ends 144 prevent the anti-oxidation gas from flowing out from the distance space S1 to thereby keep the anti-oxidation gas atmosphere in the space S1.

After the inside space S2 and the distance space S1 which the hardening regions 102 of the press formed article 101 oppose are brought to the anti-oxidation gas atmospheres as described above, the high frequency power supply device 125 applies a high frequency current to the inductive conductors 112 of the heating inductors 111. This application of current generates an induction current in the hardening regions 102 so that the hardening regions 102 are heated, and after the hardening regions 102 are raised in temperature to a predetermined temperature, the application of current to the inductive conductors 112 is stopped. Then, the cooling water is sprayed from the cooling pipes 113 to the hardening regions 102 which are thus rapidly cooled to thereby undergo hardening.

Thereafter, the jet of the anti-oxidation gas from the first anti-oxidation gas supply pipe 140, the first anti-oxidation gas jet pipes 145, the second anti-oxidation gas supply pipe 150, and the second anti-oxidation gas jet pipes 152, is stopped, and the spray of the cooling water from the cooling pipes 113 is also stopped.

Then, the cover 122 is raised by the cylinder 130, and the press formed article 101 is released from clamping of the clamping device through the fixing members 106 and taken out from the support 105 by the aforesaid loading device.

On the support 105, the next press formed article 101 is set by the loading device, and then hardening on this press formed article 101 is performed by the same operation as described above, and accordingly individual press formed articles 101 are subjected to hardening in sequence.

The press formed article 101 taken out from the support 105 by the loading device is sent to a drying step with hot air or the like, to have the cooling water attached thereto removed. Thereafter, the press formed article 101 which has been joined by welding to other parts is sent to a step for coating that is a subsequent operation after the hardening operation.

Even if the operation step is a step such that the press formed article 101 is treated in a predetermined chemical solution before the press formed article 101 is coated, the operation step can be conducted as predetermined because the hardening regions 102 have been hardened in the anti-oxidation gas atmosphere as described above, and the cooling water sprayed to the hardening regions 102 has the dissolved oxygen removed, that is, the hardening regions 102 have been hardened with the oxidation thereof prevented.

INDUSTRIAL AVAILABILITY

As described above, a press formed article, and an induction hardening method and an induction hardening apparatus therefor according to the present invention are suitable for manufacturing press formed articles such as a center pillar and so on for a vehicle which have been subjected to induction hardening.

The invention claimed is:

1. A press formed article, including an intermediate top portion which extends in a longitudinal direction and a pair of blade portions which are both bent from said intermediate top portion and extend in said longitudinal direction, with a direction of said bend being a lateral direction thereof, wherein a hardening region where hardening has been performed and a non-hardening region where hardening has not been performed are provided longitudinally and laterally within at least said pair of blade portions and an area ratio between said hardening region and said non-hardening region in said lateral direction is a ratio for achieving a demanded strength and changes along said longitudinal direction, wherein said hardening region also exists on both sides of said intermediate top portion in the direction perpendicular to said longitudinal direction within said intermediate top portion, a non-hardening region exists between said hardening regions within said intermediate top portion and said non-hardening region within said intermediate top portion is formed with a hole.

2. The press formed article according to claim 1, wherein said press formed article is a center pillar of a vehicle.

3. The press formed article according to claim 2, wherein said hardening region is provided at a portion of said center pillar corresponding to a window hole for a window glass in a side door of said vehicle.

4. The press formed article according to claim 2, wherein said hardening region is a region which widens toward an end and continuously expands from an upper portion to a lower portion.

5. A press formed article, including an intermediate top portion which extends in a longitudinal direction and a pair of blade portions which are both bent from said intermediate top portion and extend in said longitudinal direction, with a direction of said bend being a lateral direction thereof, wherein a hardening region where hardening has been performed and a non-hardening region where hardening has not been performed are provided longitudinally and laterally within at least said intermediate top portion and an area ratio between said hardening region and said non-hardening region in the direction perpendicular to said longitudinal direction of said intermediate top portion is a ratio for achieving a demanded strength and changes along said longitudinal direction, wherein said hardening region exists on both sides in the direction perpendicular to said longitudinal direction within said intermediate top portion, said non-hardening region exists between said hardening regions within said intermediate top portion and said non-hardening region within said intermediate top portion is formed with a hole.

6. The press formed article according to claim 5, wherein said press formed article is a center pillar of a vehicle.

7. The press formed article according to claim 6, wherein said hardening region is provided at a portion of said center pillar corresponding to a window hole for a window glass in a side door of said vehicle.

8. The press formed article according to claim 6, wherein said hardening region widens toward an end and continuously expands from an upper portion to a lower portion.

9. The press formed article according to claim 1, wherein a groove is provided in a non-hardening region of the intermediate top portion.

10. The press formed article according to claim 5, wherein a groove is provided in a non-hardening region of the intermediate top portion.

11. The press formed article according to claim 1, wherein a concave groove is provided in the non-hardening region between said hardening regions.

12. The press formed article according to claim 5, wherein a concave groove is provided in the non-hardening region between said hardening regions.

* * * * *